United States Patent
Pan

(10) Patent No.: US 11,563,680 B2
(45) Date of Patent: Jan. 24, 2023

(54) PSEUDO WIRE LOAD SHARING METHOD AND DEVICE

(71) Applicant: Huawei Technologies Co., Ltd., Shenzhen (CN)

(72) Inventor: Wang Pan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/187,023

(22) Filed: Feb. 26, 2021

(65) Prior Publication Data

US 2021/0211377 A1 Jul. 8, 2021

Related U.S. Application Data

(63) Continuation of application No. 16/371,476, filed on Apr. 1, 2019, now Pat. No. 10,965,594, which is a continuation of application No. PCT/CN2016/101320, filed on Sep. 30, 2016.

(51) Int. Cl.
| | |
|---|---|
| *H04L 45/00* | (2022.01) |
| *H04L 12/28* | (2006.01) |
| *H04L 12/46* | (2006.01) |
| *H04L 45/44* | (2022.01) |

(Continued)

(52) U.S. Cl.
CPC ............ *H04L 45/68* (2013.01); *H04L 12/28* (2013.01); *H04L 12/4641* (2013.01); *H04L 45/44* (2013.01); *H04L 45/50* (2013.01); *H04L 45/586* (2013.01)

(58) Field of Classification Search
CPC ..... H04L 12/28; H04L 12/4641; H04L 45/44; H04L 45/50; H04L 45/586; H04L 45/68
See application file for complete search history.

(56) References Cited

U.S. PATENT DOCUMENTS

| | | | |
|---|---|---|---|
| 8,125,926 B1 | 2/2012 | Kompella | |
| 8,175,078 B2 * | 5/2012 | Voit | ...................... H04L 12/462 |
| | | | 714/4.11 |

(Continued)

FOREIGN PATENT DOCUMENTS

| | | |
|---|---|---|
| CN | 101425879 A | 5/2009 |
| CN | 101675346 A | 3/2010 |

(Continued)

OTHER PUBLICATIONS

Rabadan, J., et al, "Interconnect Solution for EVPN Overlay networks," draft-ietf-bess-dci-evpn-overlay-01, Jul. 6, 2015, 23 pages.

(Continued)

*Primary Examiner* — Jenee Holland
(74) *Attorney, Agent, or Firm* — Conley Rose, P.C.

(57) ABSTRACT

A pseudo wire load sharing method, applied to a scenario in which a first provider edge PE device is separately connected to at least one second PE device by using at least two PWs includes receiving, by the first PE device, a data flow from a customer edge CE device, and forwarding the data flow to a PW trunk interface, where the PW trunk interface is associated with at least two active PWs; and performing, by the first PE device, load sharing processing on the data flow, and forwarding the data flow by using the at least two active PWs.

21 Claims, 11 Drawing Sheets

(51) Int. Cl.
*H04L 45/50* (2022.01)
*H04L 45/586* (2022.01)

(56) References Cited

U.S. PATENT DOCUMENTS

| | | | | |
|---|---|---|---|---|
| 8,780,699 | B1* | 7/2014 | Hasan | H04L 12/40182 |
| | | | | 709/224 |
| 2006/0245436 | A1 | 11/2006 | Sajassi | |
| 2007/0288653 | A1 | 12/2007 | Sargor et al. | |
| 2008/0151905 | A1* | 6/2008 | Krzanowski | H04L 45/50 |
| | | | | 370/395.5 |
| 2008/0181233 | A1* | 7/2008 | Washam | H04L 69/40 |
| | | | | 370/395.5 |
| 2008/0212595 | A1 | 9/2008 | Figueira et al. | |
| 2008/0253381 | A1 | 10/2008 | Wade et al. | |
| 2009/0154339 | A1 | 6/2009 | Zi | |
| 2009/0168783 | A1 | 7/2009 | Mohan et al. | |
| 2009/0296568 | A1* | 12/2009 | Kitada | H04L 45/22 |
| | | | | 370/221 |
| 2010/0329109 | A1* | 12/2010 | Kothari | H04L 45/245 |
| | | | | 370/216 |
| 2011/0164617 | A1 | 7/2011 | Yong | |
| 2011/0182189 | A1* | 7/2011 | Martini | H04L 45/245 |
| | | | | 370/248 |
| 2012/0044943 | A1 | 2/2012 | Hinz et al. | |
| 2012/0147737 | A1* | 6/2012 | Taylor | H04L 45/28 |
| | | | | 370/219 |
| 2012/0170449 | A1 | 7/2012 | Nakash | |
| 2012/0177054 | A1* | 7/2012 | Pati | H04L 12/4625 |
| | | | | 370/395.53 |
| 2012/0236730 | A1* | 9/2012 | Zhou | H04L 45/68 |
| | | | | 370/244 |
| 2012/0236868 | A1* | 9/2012 | Yan | H04L 49/3009 |
| | | | | 370/395.53 |
| 2012/0281702 | A1* | 11/2012 | Qiu | H04L 45/50 |
| | | | | 370/392 |
| 2012/0300784 | A1 | 11/2012 | Jiang | |
| 2014/0269746 | A1 | 9/2014 | Chinthalapati et al. | |
| 2014/0355419 | A1* | 12/2014 | Pillai | H04L 45/22 |
| | | | | 370/225 |
| 2015/0006757 | A1 | 1/2015 | Boutros et al. | |
| 2015/0043380 | A1* | 2/2015 | Varga | H04L 41/12 |
| | | | | 370/254 |
| 2015/0131432 | A1 | 5/2015 | Long | |
| 2015/0146727 | A1 | 5/2015 | Ye | |
| 2015/0156108 | A1 | 6/2015 | Shi | |
| 2015/0195105 | A1* | 7/2015 | Zhuang | H04L 41/12 |
| | | | | 370/254 |
| 2015/0281058 | A1* | 10/2015 | Gao | H04L 12/4633 |
| | | | | 370/401 |
| 2015/0350912 | A1* | 12/2015 | Head | H04L 63/08 |
| | | | | 726/4 |
| 2016/0036694 | A1* | 2/2016 | Abdul | H04L 41/0654 |
| | | | | 370/244 |
| 2016/0065407 | A1* | 3/2016 | Saltsidis | H04L 45/28 |
| | | | | 370/255 |
| 2016/0261487 | A1* | 9/2016 | Singh | H04L 45/70 |
| 2016/0285753 | A1* | 9/2016 | Guleria | H04L 45/38 |
| 2019/0222509 | A1* | 7/2019 | Zhang | H04L 12/2878 |

FOREIGN PATENT DOCUMENTS

| | | | |
|---|---|---|---|
| CN | 101710877 | A | 5/2010 |
| CN | 102098222 | A | 6/2011 |
| CN | 102316014 | A | 1/2012 |
| CN | 105099582 | A | 11/2015 |
| EP | 2498454 | B1 | 5/2018 |
| WO | 2013139406 | A1 | 9/2013 |

OTHER PUBLICATIONS

Sajassi, A., et al, "E-TREE Support in EVPN and PBB-EVPN," draft-ietf-bess-evpn-etree-03, Oct. 10, 2015, 16 pages.
Rabadan, J., Ed., et al, "IP Prefix Advertisement in EVPN," draft-ietf-bess-evpn-prefix-advertisement-02, Sep. 14, 2015, 24 pages.
Boutros, S., et al, "VPWS support in EVPN," draft-ietf-bess-evpn-vpws-02.txt, Oct. 15, 2015, 15 pages.
Martini, L., Ed., et al., "Pseudowire Setup and Maintenance Using the Label Distribution Protocol (LDP)," RFC 4447, Apr. 2006, 33 pages.
Sajassi, A., et al, "BGP MPLS-Based Ethernet VPN," RFC 7432, Feb. 2015, 56 pages.
Sajassi, A., Ed., et al, "Provider Backbone Bridging Combined with Ethernet VPN (PBB-EVPN)," RFC 7623, Sep. 2015, 23 pages.
Sajassi, A., Ed., et al, "Requirements for Ethernet VPN (EVPN)," RFC 7209, May 2014, 15 pages.

* cited by examiner

PSEUDO WIRE LOAD SHARING METHOD AND DEVICE

CROSS-REFERENCE TO RELATED APPLICATIONS

This application a continuation of U.S. patent application Ser. No. 16/371,476, filed on Apr. 1, 2019, which is a continuation of International Application No. PCT/CN2016/101320, filed on Sep. 30, 2016. Both of the aforementioned applications are hereby incorporated by reference in their entireties.

TECHNICAL FIELD

Embodiments of the present disclosure relate to the communications field, and in particular, to a pseudo wire load sharing method and device.

BACKGROUND

Pseudo wire emulation edge-to-edge (PWE3) refers to a layer 2 service carrying technology used to simulate, as truly as possible in a packet switched network (PSN), basic behavior and basic features of services such as asynchronous transfer mode (ATM), frame relay (FR), Ethernet, and low speed time division multiplexing (TDM) circuit.

Multiprotocol Label Switching (MPLS) PWE3 is an important technology in a metropolitan area network. With the MPLS PWE3 technology, an original access manner (such as an ATM and an FR) and an existing IP backbone network can be well converged in order to reduce network reconstruction and operation expenses. With the MPLS PWE3 technology, the IP backbone network may access various access networks in order to transform and enhance an original data network. After an MPLS backbone network is constructed, a conventional data communications network ATM/FR or the like may be configured as an access network closer to a user, but an ATM/FR user cannot sense a change of a network structure.

A virtual circuit or a pseudo wire (PW) provided by the MPLS PWE3 has been widely deployed in provider networks. However, a current technology cannot support PW load sharing, and the PW cannot be used to perform load sharing transmission on a data flow.

SUMMARY

Embodiments of the present disclosure provide a PW load sharing method and device in order to resolve a problem that a PW does not support load sharing, and the PW cannot be effectively used to transmit large data traffic.

To resolve the foregoing problem, a first aspect of the embodiments of the present disclosure provides a PW load sharing method, applied to a scenario in which a first provider edge PE device is separately connected to at least one second PE device by using at least two PWs, where the method comprises receiving, by the first PE device, a data flow from a customer edge CE device, and forwarding the data flow to a PW trunk interface, where the PW trunk interface is associated with at least two active PWs; and performing, by the first PE device, load sharing processing on the data flow, and forwarding the data flow by using the at least two active PWs.

The PW trunk interface is associated with the at least two active PWs, and in this way, this embodiment of the present disclosure provides the load sharing forwarding method for the data flow in order to increase a bandwidth and a throughput for transmitting the data flow by using the PW.

In a first possible implementation of the first aspect, before the forwarding the data flow to a PW trunk interface, the method further comprises creating, by the first PE device, the PW trunk interface, and associating the PW trunk interface with the at least two PWs; and determining, by the first PE device from the at least two PWs, at least two PWs as active PWs.

With reference to the first aspect or the first possible implementation of the first aspect, in a second possible implementation of the first aspect, the determining, by the first PE device from the at least two PWs, at least two PWs as active PWs comprises obtaining, by the first PE device, an active PW quantity parameter, where the active PW quantity parameter represents a quantity of PWs in an active state, and is a positive integer greater than or equal to 2; and determining at least two active PWs from the at least two PWs according to the active PW quantity parameter.

In this embodiment of the present disclosure, by configuring the active PW quantity parameter, a user (for example, a network administrator or a user of a third party application) may plan a load sharing PW according to a requirement of the user in order to improve flexibility of PW load sharing deployment.

When the active PW quantity parameter is set to be equal to a quantity of PWs associated with the PW trunk interface, it indicates all-active load sharing deployment. In this case, a bandwidth of the PW can be used to a greatest extent, and bandwidths of all PWs are combined to provide a greatest bandwidth guarantee. When the active PW quantity parameter is set to be less than the quantity of PWs associated with the PW trunk interface, and is greater than 1, it indicates multi-active load sharing deployment. In this case, backup protection is added for a primary load sharing PW. When one or more primary PWs are faulty, it may be ensured that forwarding is not interrupted, a bandwidth provided by the PW is not decreased, and a service is not affected, and this improves reliability of PW load sharing.

With reference to the first aspect or the second possible implementation of the first aspect, in a third possible implementation of the first aspect, the obtaining, by the first PE device, an active PW quantity parameter comprises configuring, by the first PE device, the active PW quantity parameter on the first PE device according to a configuration command; or receiving, by the first PE device, a message sent by a control and management device, and obtaining the active PW quantity parameter from the message; or generating, by the first PE device, the active PW quantity parameter by running an algorithm; or setting a default value of the active PW quantity parameter during software implementation of the first PE device.

With reference to any one of the first aspect, or the second to the third possible implementations of the first aspect, in a fourth possible implementation of the first aspect, the determining at least two active PWs from the at least two PWs according to the active PW quantity parameter comprises obtaining, by the first PE device, a priority of each PW in the at least two PWs, and determining at least two PWs as active PWs according to the priority of each PW in the at least two PWs and the active PW quantity parameter.

In this embodiment of the present disclosure, by setting the priority of each PW, the user (for example, a network administrator or a user of a third party application) may more flexibly plan a load sharing PW according to a requirement of the user in order to further improve flexibility of PW load sharing deployment.

With reference to the first aspect or the fourth possible implementation of the first aspect, in a fifth possible implementation of the first aspect, the determining at least two PWs as active PWs according to the priority of each PW in the at least two PWs and the active PW quantity parameter comprises obtaining, by the first PE device, the priority of each PW in the at least two PWs, and determining, from the at least two PWs, at least two PWs with higher priority ranks as active PWs according to a descending order of the priorities of the PWs and the active PW quantity parameter, where the priority of the PW is used to indicate precedence in using the PW as an active PW.

With reference to any one of the first aspect, or the second to the third possible implementations of the first aspect, in a sixth possible implementation of the first aspect, the determining at least two active PWs from the at least two PWs according to the active PW quantity parameter comprises obtaining, by the first PE device, an IP address of a peer second PE of each PW in the at least two PWs, and determining at least two PWs as active PWs according to the IP address of the peer second PE of each PW in the at least two PWs and the active PW quantity parameter.

The load sharing PW is selected according to an IP address of a peer PE device of each PW, and in this way, this embodiment of the present disclosure provides a PW load sharing method that is simple and easy to perform without a need of an extra setting.

With reference to the first aspect or the sixth possible implementation of the first aspect, in a seventh possible implementation of the first aspect, the determining at least two PWs as active PWs according to the IP address of the peer second PE of each PW in the at least two PWs and the active PW quantity parameter comprises obtaining, by the first PE device, the IP address of the peer second PE of each PW in the at least two PWs, and determining, from the at least two PWs, at least two PWs with higher IP address ranks as active PWs according to a descending order of the IP addresses of the peer second PEs of the PWs and the active PW quantity parameter; or obtaining, by the first PE device, the IP address of the peer second PE of each PW in the at least two PWs, and determining, from the at least two PWs, at least two PWs with higher IP address ranks as active PWs according to an ascending order of the IP addresses of the peer second PEs of the PWs and the active PW quantity parameter.

With reference to any one of the first aspect, or the second to the third possible implementations of the first aspect, in an eighth possible implementation of the first aspect, the determining at least two active PWs from the at least two PWs according to the active PW quantity parameter comprises obtaining, by the first PE device, a priority of each PW in the at least two PWs and an IP address of a peer second PE of each PW in the at least two PWs, and determining at least two PWs as active PWs according to the priority of each PW in the at least two PWs, the IP address of the peer second PE of each PW in the at least two PWs, and the active PW quantity parameter.

In this embodiment of the present disclosure, by using the method in which the priority and the IP address are combined, a problem that a load sharing PW cannot be determined according to the PW priority is resolved, and a solution in which a load sharing PW is preferably determined is provided, and this further improves accuracy and flexibility of PW load sharing deployment.

With reference to any one of the first aspect, or the first to the eighth possible implementations of the first aspect, in a ninth possible implementation of the first aspect, the receiving, by the first PE device, a data flow from a CE device, and forwarding the data flow to a PW trunk interface comprises receiving, by the first PE device, the data flow from the CE device through an attachment circuit AC interface, and forwarding the data flow to the PW trunk interface according to an association relationship between the AC interface and the PW trunk interface; or receiving, by the first PE device, the data flow from the CE device through an attachment circuit AC interface, forwarding the data flow to a virtual switch instance VSI, searching a MAC forwarding table in the VSI to obtain the PW trunk interface, and forwarding the data flow to the PW trunk interface.

With reference to any one of the first aspect, or the first to the ninth possible implementations of the first aspect, in a tenth possible implementation of the first aspect, the first PE device performs, based on a configured hash gene, cyclic redundancy check on the data flow to obtain a check value, performs a modulo operation according to a load sharing PW quantity value by using the check value to obtain a remainder, uses the remainder as a key value, then uses the key value as an index to search a PW trunk forwarding table in order to match an active PW for performing load sharing processing, and forwards the data flow by using the at least two active PWs.

By identifying a packet eigenvalue (hash gene) carried in the data flow, per-flow PW load sharing forwarding is implemented by using a hash algorithm, and this obtains a better service flow order preserving effect.

With reference to any one of the first aspect, or the first to the ninth possible implementations of the first aspect, in an eleventh possible implementation of the first aspect, the first PE device determines, according to a value obtained by a counter by counting each data packet in the data flow, an active PW to perform load sharing forwarding.

By selecting the active PW according to the count value of each data packet, per-packet PW load sharing is implemented, and this obtains relatively high forwarding efficiency.

According to a second aspect, the present disclosure provides a first PE device, and the first PE device is configured to execute the method in any one of the first aspect or the possible implementations of the first aspect. In an embodiment, the first PE device comprises a module configured to execute the method in any one of the first aspect or the possible implementations of the first aspect.

According to a third aspect, the present disclosure provides a first PE device, and the first PE device comprises a receiver, a processor, a transmitter, a random access memory, a read-only memory, and a bus. The processor is separately coupled to the receiver, the transmitter, the random access memory, and the read-only memory by using the bus. When the first PE device needs to be run, a basic input/output system or a bootloader in an embedded system that is built into the read-only memory is used to lead a system to start, and lead the first PE device to enter a normal running state. After entering the normal running state, the first PE device runs an application program and an operating system in the random access memory such that the processor executes the method in any one of the first aspect or the possible implementations of the first aspect.

According to a fourth aspect, the present disclosure provides a computer readable medium, configured to store a computer program, where the computer program comprises an instruction used to execute the method in any one of the first aspect or the possible implementations of the first aspect.

According to a fifth aspect, a first PE device is provided, and the first PE device comprises a main control board and an interface board, and may further include a switching board. The first PE device is configured to execute the method in any one of the first aspect or the possible implementations of the first aspect. In an embodiment, the first PE device comprises a module configured to execute the method in any one of the first aspect or the possible implementations of the first aspect.

According to a sixth aspect, a first PE device is provided, and the first PE device comprises an interface board, and may further include a switching board. The first PE device is configured to execute functions of the interface board in the fifth aspect, and may further execute functions of the switching board in the fifth aspect.

According to a seventh aspect, a controller is provided, and the controller comprises a receiver, a processor, a transmitter, a random access memory, a read-only memory, and a bus. The processor is separately coupled to the receiver, the transmitter, the random access memory, and the read-only memory by using the bus. When the controller needs to be run, a basic input/output system or a bootloader in an embedded system that is built into the read-only memory is used to lead a system to start, and lead the controller to enter a normal running state. After entering the normal running state, the controller runs an application program and an operating system in the random access memory such that the processor executes functions of the main control board in the fifth aspect.

In the present disclosure, a PE device creates a PW trunk interface, and the PW trunk interface is associated with at least two active PWs. When receiving a data flow from a CE device, the PE device leads the data flow to the PW trunk interface in order to perform load sharing forwarding by using the at least two active PWs associated with the PW trunk interface such that the PW can be effectively used to transmit large data traffic. Therefore, this increases a bandwidth and a throughput, enhances a data processing capability of the PE device, and improves PW deployment flexibility.

BRIEF DESCRIPTION OF DRAWINGS

To describe the technical solutions in the embodiments of the present disclosure more clearly, the following briefly describes the accompanying drawings required for describing the embodiments. The accompanying drawings in the following description merely show some embodiments of the present disclosure, and a person of ordinary skill in the art can derive other implementations from these accompanying drawings without creative efforts. In addition, all these embodiments or implementations fall within the protection scope of the present disclosure.

DESCRIPTION OF EMBODIMENTS

The technical solutions according to embodiments of the present disclosure are clearly described in the following with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A network architecture and a service scenario described in the embodiments of the present disclosure are intended to describe the technical solutions in the embodiments of the present disclosure more clearly, but are not construed as a limitation on the technical solutions provided in the embodiments of the present disclosure. A person of ordinary skill in the art may understand that, with evolution of the network architecture and emergence of a new service scenario, the technical solutions provided in the embodiments of the present disclosure are also applicable to a similar technical problem.

Figure 1:
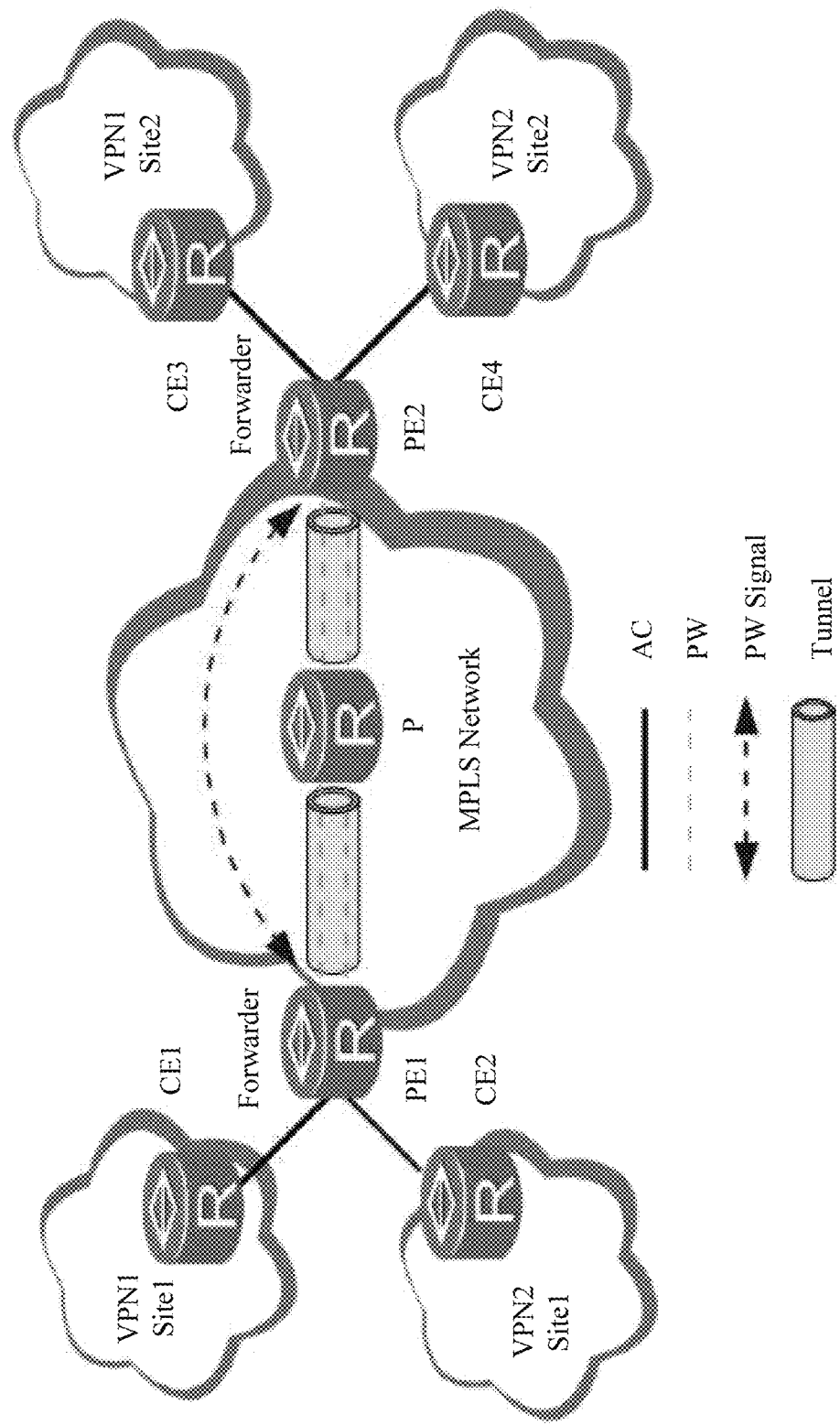
FIG. 1 is a schematic diagram of an application background of the present disclosure.

The technical solutions described in the present disclosure may be applied to a network constructed based on an MPLS PWE3 technology. For PWE3, the Label Distribution Protocol (LDP) or the like is used as a signaling protocol, various layer 2 services (for example, various layer 2 data packets) on a customer edge (CE) end are carried on a tunnel (for example, an MPLS LSP tunnel, a TE tunnel, or a GRE tunnel), and layer 2 data on the CE end is transparently transmitted. As shown in FIG. 1, basic transmission components of a PWE3 network comprises an attachment circuit (AC), a PW, a forwarder, a tunnel, and a PW signaling protocol. A packet flow direction in a virtual private network (VPN) 1 from a CE1 to a CE3 is used as an example to describe a basic flow direction of a data flow, and the basic flow direction of the data flow is as follows: The CE1 sends a layer 2 packet, and is connected to a provider edge (PE) 1 by using an AC; after the PE1 receives the packet, a forwarder of the PE1 selects a PW to forward the packet; the PE1 then generates two layers of MPLS labels according to a forwarding table entry of the PW, where an inner layer label (that is, a private network label) is used to identify the PW, and an outer layer label (that is, a public network label) is used to pass through a tunnel to reach a PE2; and the layer 2 packet reaches the PE2 after passing through a tunnel of a public network, a system removes the private network label, and a forwarder of the PE2 selects an AC to forward the packet in order to forward the layer 2 packet to the CE3.

It should be noted that, the PW may be referred to as a pseudo wire, or may be referred to as a virtual circuit. With reference to a specific deployment scenario, the forwarder may be deployed on a device such as a PE, an underlayer PE (UPE), or a superstratum PE (SPE). In a hierarchical deployment scenario, PE devices are classified into two types: a UPE and an SPE. The UPE is an aggregation device of a user, that is, a device directly connected to the CE; the UPE is also referred to as a user-side PE. The SPE is a device that is connected to the UPE and that is located in the network, and is also referred to as a switch PE, and a meaning of the switch PE may be understood by a person skilled in the art. The PE and the PE device have a same meaning in the embodiments of the present disclosure, and may be interchanged. Likewise, the CE and the CE device may be interchanged, and P and a P device may be interchanged.

It should be further noted that, the CE device, the PE device, and the P device may be routers or switches. Usually, one side of the CE device is connected to the PE or the UPE device, and the other side is connected to user equipment (UE) such that user equipment traffic is forwarded and the user equipment accesses a provider network. The UE may include various devices that have a wireless communications function, such as a handheld device, an in-vehicle device, a wearable device, a computer device, or another processing device connected to a wireless modem, and various forms of user equipment, such as a mobile station (MS), a terminal, and terminal equipment (TE). For ease of description, in this application, the devices mentioned above are collectively referred to as user equipment or UE.

Although the PW provided in the MPLS PWE3 is widely applied to the network to provide a VPN service and carry a data flow, the PW does not support load sharing, and the PW cannot be effectively used to transmit large data traffic.

Therefore, the embodiments of the present disclosure provide a PW load sharing method and apparatus. A PE device creates a PW trunk interface, and the PW trunk interface is associated with at least two active PWs. When receiving a data flow from a CE device, the PE device leads the data flow to the PW trunk interface in order to perform load sharing forwarding by using the at least two active PWs associated with the PW trunk interface such that the PW can be effectively used to transmit large data traffic. It should be noted that, in some hierarchical networking scenarios, the PE device may be a UPE device, and the following describes this in detail.

For different application requirements and different network design requirements, the MPLS PWE3 may be deployed in different network application scenarios, for example, a typical PWE3 layer 2 virtual private network (L2VPN) scenario, and a scenario in which the PW accesses an Ethernet virtual private network (EVPN). With reference to the technical solutions of the present disclosure, the following further separately describes the application scenarios of the present disclosure in detail.

Figure 2A:
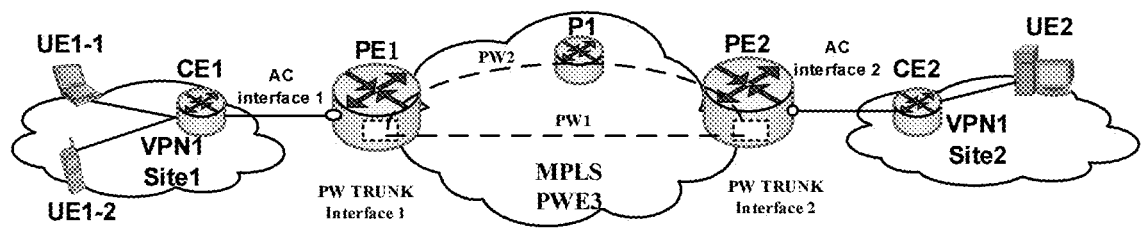
FIG. 2A is a schematic diagram of a possible application scenario of the present disclosure.

FIG. 2a shows an application scenario of a PWE3 L2VPN according to an embodiment of the present disclosure. In this typical PWE3 single-segment networking application, a backbone network is an MPLS/Internet Protocol (IP) network, and manners for accessing local area networks are different. For example, a provider establishes a nationwide backbone network, and provides a PWE3 service, and customers are separately distributed in Beijing (for example, Site1) and Shanghai (for example, Site2). The Beijing segment accesses the backbone network of the provider in an ATM manner, and the Shanghai counterpart accesses the backbone network of the provider in an FR manner. The provider may establish a PWE3 connection between two access points: a PE1 in Beijing and a PE2 in Shanghai, that is, a PW connection. When data traffic between the Beijing segment and the Shanghai segment continues to increase, the customer expects that the PW can provide a bandwidth of 100 M to carry the data traffic between the two areas. However, in this case, there are only one tunnel 1 with a bandwidth of 40 M and another tunnel 2 with a bandwidth of 60 M between the two areas, neither the bandwidth of the tunnel 1 nor the bandwidth of the tunnel 2 reaches 100 M, and the tunnel 1 or the tunnel 2 cannot carry the PW with a bandwidth of 100 M. Therefore, in some approaches, a customer requirement cannot be met.

In the present disclosure, a PW trunk interface 1 is created on the PE1, a PW trunk interface 2 is created on the PE2, the PW trunk interface 1 is associated with a PW1 and a PW2, and the PW trunk interface 2 is also associated with the PW1 and the PW2. The PW1 is carried on the tunnel 1 with a bandwidth of 40 M, and a path of the tunnel 1 is PE1→PE2. The PW2 is carried on the tunnel 2 with a bandwidth of 60 M, a path of the tunnel 2 is PE1→P1→PE2, and the P1 is a provider (P) device. The PW1 is associated with the PW2 by using the PW trunk interface, and the two PWs provide a bandwidth of 100 M together in a load sharing forwarding manner in order to meet the customer requirement. When receiving a data flow from a CE1, the PE1 leads the data flow to the PW trunk interface such that the PW1 and the PW2 that are associated by using the PW trunk interface perform load sharing forwarding. After the bandwidth of the PW1 and the bandwidth of the PW2 are combined, the customer requirement for a bandwidth of 100 M is met.

It should be noted that, according to whether source nodes on ends of deployed PWs are the same and destination nodes on the other ends of the deployed PWs are the same, FIG. 2a belongs to a deployment scenario in which source nodes are the same and destination nodes are the same, that is, the PW1 and the PW2 have the same source node PE1 and the same destination node PE2. In addition, in different scenarios, the tunnel 1 carrying the PW1 and the tunnel 2 carrying the PW2 may pass through a same path PE1→PE2, or a path of the tunnel 1 may be PE1→PE2, and a path of the tunnel 2 is PE1→middle P→PE2. The middle P is between the PE1 and the PE2, may be one P device, or may be multiple P devices, and varies with actual network deployment. It should be further noted that, for brevity of an accompanying drawing, in the accompanying drawing of the embodiments of the present disclosure, a tunnel carrying a PW is not depicted, and this may be understood by a person skilled in the art.

Figure 2B:
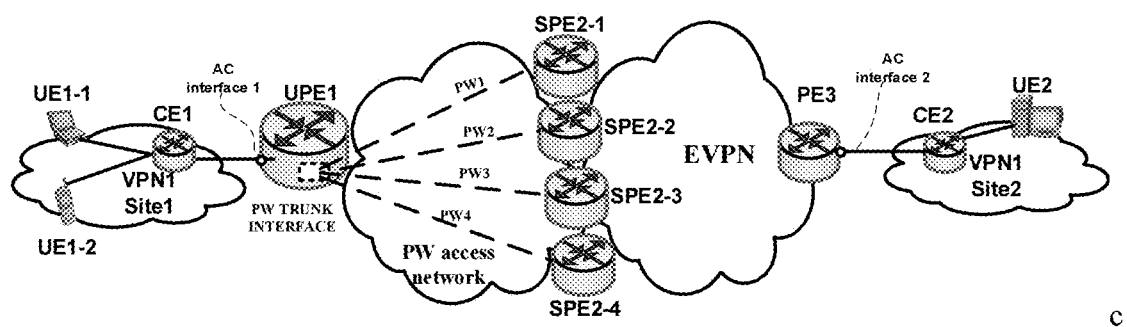
FIG. 2B is a schematic diagram of another possible application scenario of the present disclosure.

FIG. 2b shows an application scenario in which a PW accesses an EVPN according to an embodiment of the present disclosure. The EVPN is a solution that provides an Ethernet multipoint service in an MPLS network and that is of a next generation of Ethernet layer 2 virtual private network L2VPN, and is used as a mainstream solution in network designs of major providers to carry a layer 2 service. In the EVPN, MAC learning between PEs is implemented in a control plane; and for a control protocol, the Border Gateway Protocol (BGP) is used as a protocol of the control plane in order to perform Media Access Control (MAC) address learning, access topology, and VPN endpoint discovery.

Currently, in the Internet Protocol (IP)/MPLS network, a PW is used to access the EPVN, and an end-to-end bearer is implemented based on an MPLS technology, thereby implementing end-to-end EVPN deployment in a provider network. One of important advantages of the EVPN solution is implementing multihoming multi-active access of a client device. However, currently, in a solution in which an EVPN is accessed by using a virtual leased line (VLL) and a virtual private LAN service (VPLS) based on the PW technology, as shown in FIG. 2b, a UPE1 is connected to an SPE2-1, an SPE2-2, an SPE2-3, and an SPE2-4 by using four PWs in order to implement primary/secondary PW redundancy protection and improve service reliability. However, the PW does not support load sharing, an advantage of the EVPN of supporting multihoming multi-active access of the client device cannot be effectively exerted, and the multihoming PW cannot be used to provide a transmission capability of a larger bandwidth.

In the present disclosure, a PW trunk interface is created on the UPE1, and the PW trunk interface is associated with a PW1, a PW2, a PW3, and a PW4. The PW1 is carried on a tunnel 1, the PW2 is carried on a tunnel 2, the PW3 is carried on a tunnel 3, and the PW4 is carried on a tunnel 4. The PW trunk interface is associated with the PW1, the PW2, the PW3, and the PW4, where two PWs, the PW1 and the PW2, serve as active PWs to perform load sharing forwarding, and the PW3 and the PW4 serve as non-active PWs and are used as backup PWs for the active PWs. The two active PWs, the PW1 and the PW2, are used to perform load sharing forwarding, and the PW1 and the PW2 are combined to provide a transmission capability of a larger bandwidth in order to sufficiently exert the advantage of the EVPN of supporting multihoming multi-active access of the client device.

Figure 2C:
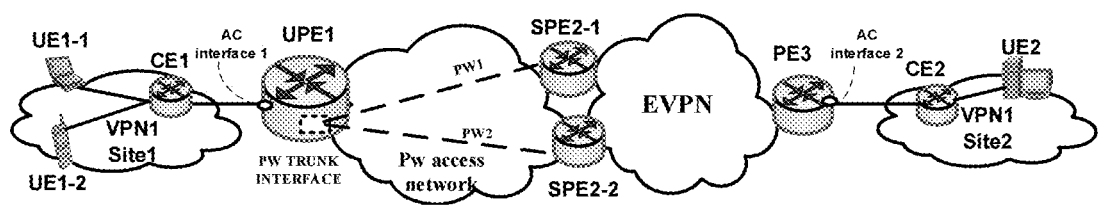
FIG. 2C is a schematic diagram of still another possible application scenario of the present disclosure.

The foregoing describes a multi-active PW deployment manner (as shown in FIG. 2b, some of the four PWs are in an active state, and the other are in a non-active state), or there may be an all-active PW deployment manner (as shown in FIG. 2c, both two PWs are in the active state, and there is no backup PW). As shown in FIG. 2c, the UPE1 is connected to the SPE2-1 and the SPE2-2 by using the two PWs, the PW1 is carried on the tunnel 1, and the PW2 is carried on the tunnel 2. In the present disclosure, a PW trunk interface is created on the UPE1, the PW trunk interface is associated with the PW1 and the PW2, the PW1 and the PW2 serve as two active PWs to perform load sharing forwarding, and the two PWs are combined to provide a transmission capability of a larger bandwidth.

It should be noted that, according to whether source nodes on ends of deployed PWs are the same and destination nodes on the other ends of the deployed PWs are the same, FIG. 2b and FIG. 2c belong to a deployment scenario in which source nodes are the same but destination nodes are different. That is, as shown in FIG. 2b, the PW1, the PW2, the PW3, and the PW4 have the same source node PE1 and different destination nodes: the SPE2-1, the SPE2-2, the SPE2-3, and the SPE2-4. For another example, in FIG. 2c, the PW1 and the PW2 have the same source node UPE1 and different destination nodes: the SPE2-1 and the SPE2-2 (or may be referred to as a PE2-1 and a PE2-2). For brief and clear description, two or four load sharing PWs are mainly used as examples for description in the foregoing application scenarios. In actual application, a quantity of load sharing PWs may be at least two, for example, three, five, or six. The multiple load sharing PWs may be carried on one tunnel, or may be respectively carried on multiple different tunnels. Paths passed through by the multiple different tunnels may be the same, or may be different, and this is not limited in the present disclosure. In addition, the active PW mentioned in the present disclosure indicates that a state of the PW is active, and an active state means that the PW can be used to carry or forward a data flow. In a primary/secondary protection scenario, the active PW is usually used as a primary PW. Correspondingly, the state of the PW may be non-active, and the non-active state means that the PW cannot be used to carry or forward a data flow, and is usually used as a secondary PW. When the primary PW is faulty, the PW is switched to the secondary PW.

The foregoing describes several possible application scenarios related to the present disclosure, and based on this, the following further describes the embodiments of the present disclosure in detail.

Figure 3:
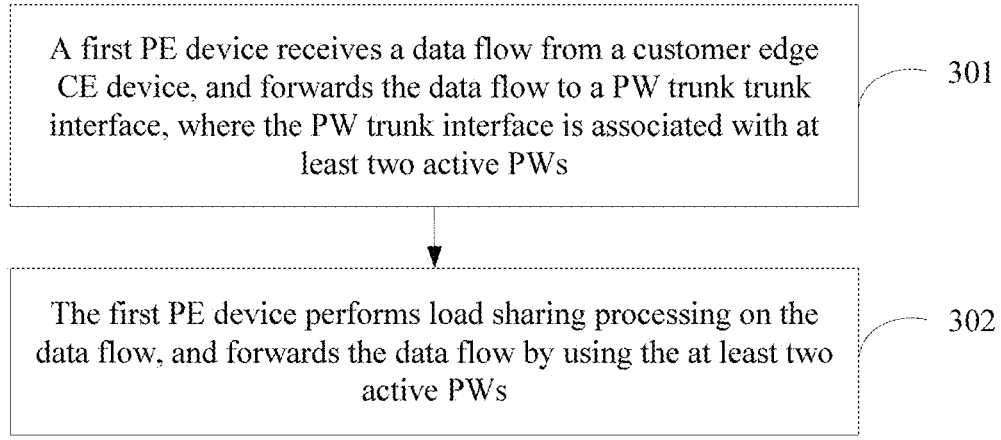
FIG. 3 is a schematic diagram of a PW load sharing forwarding procedure according to an embodiment of the present disclosure.

FIG. 3 is a schematic flowchart of a PW load sharing method according to an embodiment of the present disclosure. The method is applied to networking in which a first PE device is connected to one or more second PE devices by using at least two PWs.

In an example, as shown in FIG. 2a, a first PE device (PE1) is connected to one second PE device (PE2) by using at least two PWs (a PW1 and a PW2).

In another example, as shown in FIG. 2b, a first PE device (UPE1) is connected to four second PE devices (an SPE2-1, an SPE2-2, an SPE2-3, and an SPE2-4) by using at least two PWs (a PW1, a PW2, a PW3, and a PW4).

In still another example, as shown in FIG. 2c, a first PE device (UPE1) is connected to two second PE devices (an SPE2-1 and an SPE2-2) by using at least two PWs (a PW1 and a PW2).

It should be noted that, in different PW deployment scenarios, the first PE device may be a PE device, or may be a UPE device; and the second PE device may be a PE device, an SPE device, or the like.

A solution provided in this embodiment of the present disclosure comprises a 301 part and a 302 part, and the following separately describes the 301 part and the 302 part.

In the 301 part, the first PE device receives a data flow from a customer edge CE device, and forwards the data flow to a PW trunk interface, where the PW trunk interface is associated with at least two active PWs.

Before forwarding the data flow to the PW trunk interface, the first PE device creates the PW trunk interface. The PW trunk interface is a logical interface, and the logical interface is an interface that can implement a data exchange function but does not physically exist and that needs to be established by means of configuration, and is an interface implemented by using a software technology. In an embodiment, the PW trunk interface may be created by a network administrator on the first PE device by means of configuration by using a command line, may be created by the first PE device by means of configuration according to an instruction of a message that is sent by another control and management device, or may be created by the first PE device by means of automatic configuration by running algorithm software. The logical interface is relative to a physical interface, and the physical interface is a hardware interface that can be seen by a person, for example, an Ethernet interface on a router or a PE device.

After the first PE device creates the PW trunk interface, the PW trunk interface is associated with the at least two PWs, and the at least two PWs include at least two active PWs. The PW trunk interface is associated with the at least two active PWs, and in this way, this embodiment of the present disclosure provides the load sharing forwarding method for the data flow in order to increase a bandwidth and a throughput for transmitting the data flow by using the PW.

There may be two mechanisms for associating the PW trunk interface with at least two active PWs.

Mechanism 1: The first PE device directly uses the at least two PWs associated with the PW trunk interface as active PWs. That is, the first PE device directly uses, by default, all PWs associated with the PW trunk interface to perform load sharing forwarding. Therefore, in Mechanism 1, there is no need to determine an active/non-active state. The mechanism is applicable to an all-active PW deployment manner.

Mechanism 2: The first PE device determines at least two PWs as active PWs from the at least two PWs, and uses the determined at least two active PWs to perform load sharing forwarding. That is, the first PE device needs to select some or all of PWs as active PWs by means of determining in order to perform load sharing forwarding. If some of the PWs are determined to be in the active state, a remaining PW is in a non-active state (used as a backup PW). Therefore, in Mechanism 2, there is a need to determine an active/non-active state. The mechanism is applicable to a multi-active PW load sharing (referred to as multi-active PW or multi-active in this specification) deployment manner or an all-active PW load sharing (referred to as all-active PW or all-active in this specification) deployment manner.

Based on Mechanism 2, in the multi-active deployment manner and the all-active deployment manner, an active/non-active state of the PW needs to be determined on the first PE device, and determining the active/non-active state of the PW may be directly completed (that is, there is no need to configure the following primary/secondary mode or the following independent mode), or may be completed in the two modes after the two modes are configured. One mode is the primary/secondary mode, and the PW trunk interface may be set to the primary/secondary mode. That is, the first PE device determines an active/non-active state of the at least two PWs, and separately notifies a peer second PE device of a state of each PW. The other mode is the independent mode, and the PW trunk interface may be set to the independent mode. That is, after the active state of the PW is determined by another remote device (for example, the second PE device), the first PE device is notified of the active state of the PW. The second PE device determines the active/non-active state of the at least two PWs, and separately notifies the first PE device of a state of each PW.

The following method for determining the active/non-active state of the PW is applicable to a scenario in which the first PE device directly determines the state and a scenario in which the first PE device determines the state in the primary/secondary mode. It should be noted that, when determining the state in the primary/secondary mode, the first PE device needs to configure the primary/secondary mode on the PW trunk interface. Otherwise, when directly determining the state, the first PE device does not need to configure the primary/secondary mode or the independent mode on the PW trunk interface.

In a specific implementation, the first PE device obtains an active PW quantity parameter, and determines, from the at least two PWs, at least two PWs as active PWs according to the active PW quantity parameter. The active PW quantity parameter is a positive integer greater than or equal to 2, represents a quantity of PWs in an active state, and may be configured according to a requirement of networking or a user. In an embodiment, the active PW quantity parameter may be pre-configured by a network administrator on the first PE device by using a command line, may be configured by the first PE device according to an instruction of a message that is sent by another control and management device, may be automatically generated and configured by the first PE device by running algorithm software, or may be a default value configured during software implementation of the first PE device. As shown in FIG. 2c, for example, the PW trunk interface of the UPE1 is associated with two PWs (respectively, the PW1 and the PW2), and the active PW quantity parameter is 2; therefore, the PW1 and the PW2 are determined as active PWs.

By configuring the active PW quantity parameter, the user (for example, the network administrator or a user of a third party application) may plan a load sharing PW according to a requirement of the user in order to improve flexibility of PW load sharing deployment. In an embodiment, multi-active load sharing or all-active load sharing may be configured according to the requirement of the user. When the active PW quantity parameter is set to be equal to a quantity of PWs associated with the PW trunk interface, it indicates all-active load sharing deployment. In this case, a bandwidth of the PW can be used to a greatest extent, and bandwidths of all PWs are combined to provide a greatest bandwidth guarantee. However, no secondary PW is deployed for protection when there is a fault, and reliability is relatively low. When the active PW quantity parameter is set to be less than the quantity of PWs associated with the PW trunk interface, and is greater than 1, it indicates multi-active load sharing deployment. In this case, backup protection is added for a primary load sharing PW. When one or more primary PWs are faulty, it may be ensured that forwarding is not interrupted, a bandwidth provided by the PW is not decreased, and a service is not affected, and this improves reliability of PW load sharing.

In a specific implementation, that the first PE device determines, from the at least two PWs, M (that is, at least two) PWs as active PWs according to the active PW quantity parameter (for example, the active PW quantity parameter is set to M, and M is a positive integer greater than or equal to 2) may include the following manners.

Manner 1: The first PE device obtains a priority of each PW in the at least two PWs, where the priority of the PW is used to indicate precedence in using the PW as an active PW. In an embodiment, a method for obtaining the priority of each PW may be as follows. A network administrator pre-configures the priority of each PW on the first PE device by using a command line; or the first PE device receives a message sent by another control and management device, where the message carries the priority of each PW; or the first PE device automatically generates the priority of each PW by running an algorithm; or the first PE device configures a default value of the priority of each PW during software implementation of the first PE device. The first PE device determines, from the at least two PWs, M PWs with higher priority ranks as active PWs according to a descending order of the priorities of the PWs.

As shown in FIG. 2b, for example, a priority of the PW1 is 0, a priority of the PW2 is 1, a priority of the PW3 is 2, and a priority of the PW4 is 3. An ascending order of 0, 1, 2, 3, and . . . indicates a descending order of priorities. That is, the priority 0 indicates a highest priority, and the priority 3 indicates a lowest priority. If M=2, the PW1 and the PW2 with higher priorities are selected as active PWs.

By setting the priority of each PW, the user (for example, the network administrator or a user of a third party application) may more flexibly plan a load sharing PW according to a requirement of the user in order to further improve flexibility of PW load sharing deployment.

Manner 2: The first PE device obtains an IP address of a peer second PE of each PW in the at least two PWs, and determines, from the at least two PWs, M PWs with a relatively large IP address as active PWs according to a descending order of the IP addresses of the peer second PEs of the PWs. Alternatively, on the contrary, the first PE device determines, from the at least two PWs, M PWs with a relatively small IP address as active PWs according to an ascending order of the IP addresses of the peer second PEs of the PWs. As shown in FIG. 2b, for example, an IP address of a peer SPE2-1 of the PW1 is 100.1.1.1/24, an IP address of a peer SPE2-2 of the PW2 is 90.1.1.1/24, an IP address of a peer SPE2-3 of the PW3 is 80.1.1.1/24, and an IP address of a peer SPE2-4 of the PW4 is 70.1.1.1/24. A descending order of IP addresses is the SPE2-1, the SPE2-2, the SPE2-3, and the SPE2-4. If M=2, the PW1 and the PW2 whose peer PE devices have relatively large IP addresses are selected as active PWs. Alternatively, an ascending order of IP addresses is the SPE2-4, the SPE2-3, the SPE2-2, and the SPE2-1. If M=2, the PW4 and the PW3 whose peer PE devices have relatively small IP addresses are selected as active PWs.

The load sharing PW is selected according to an IP address of a peer PE device of each PW, and in this way, this embodiment of the present disclosure provides a PW load sharing method that is simple and easy to perform without a need of an extra setting.

Manner 3: The first PE device first obtains a priority of each PW in the at least two PWs; and when the first PE device determines at least two PWs with higher priority ranks as active PWs according to a descending order of the priorities of the PWs in the at least two PWs, if there are at least two PWs with an equal priority, the first PE device then obtains an IP address of a peer second PE of each PW in the at least two PWs with the equal priority, and determines, from the at least two PWs with the equal priority, at least two PWs as active PWs according to an ascending or a descending order of the IP addresses of the peer second PEs of the PWs. Manner 3 is a combination of Manner 1 and Manner 2. As shown in FIG. 2b, for example, the priority of the PW1 is 0, the priority of the PW2 is 1, the priority of the PW3 is 1, and the priority of the PW4 is 3; and the IP address of the peer SPE2-1 of the PW1 is 100.1.1.1/24, the IP address of the peer SPE2-2 of the PW2 is 90.1.1.1/24, the IP address of the peer SPE2-3 of the PW3 is 80.1.1.1/24, and the IP address of the peer SPE2-4 of the PW4 is 70.1.1.1/24. If M=2, the PW1 with the highest priority is first determined according to the priorities; however, priorities of the PW2 and the PW3 are equal (both are 1), and to meet M=2, one PW needs to be selected from the PW2 and the PW3. In this case, if a PW corresponding to a peer PE of a relatively large IP address is selected according to a descending order of IP addresses, because the IP address of the peer SPE2-2 of the PW2 is greater than the IP address of the peer SPE2-3 of the PW3, the PW2 is selected. Therefore, the PW1 and the PW2 are finally selected as active PWs. Alternatively, if a PW corresponding to a peer PE of a relatively small IP address is selected according to an ascending order of IP addresses, because the IP address of the peer SPE2-3 of the PW3 is smaller than the IP address of the peer SPE2-2 of the PW2, the PW3 is selected. Therefore, the PW1 and the PW3 are finally selected as active PWs.

In this embodiment of the present disclosure, by using the method in which the priority and the IP address are combined, a problem that a load sharing PW cannot be determined according to the PW priority is resolved, and a solution in which a load sharing PW is preferably determined is provided, and this further improves accuracy and flexibility of PW load sharing deployment.

It should be noted that, two endpoints of a virtual circuit including the PW are the first PE device and the second PE device. From a perspective of the first PE device, a peer end of the PW is the second PE device; and from a perspective of the second PE device, a peer end of the PW is the first PE device. In this embodiment of the present disclosure, from the perspective of the first PE device, an IP address of the peer second PE device of the PW may be an IP address of a physical interface of the PW on the second PE device, or may be a management IP address of the second PE device. In a PW load sharing deployment scenario in which source nodes are the same and destination nodes are the same, as shown in FIG. 2a, an IP address of a peer second PE device of a PW is usually an IP address of a physical interface of the PW on the second PE device. In a PW load sharing deployment scenario in which source nodes are the same but destination nodes are different, as shown in FIG. 2b and FIG. 2c, an IP address of a peer second PE device of a PW may be an IP address of a physical interface of the PW on the second PE device, or may be a management IP address of the second PE device.

Figure 2D:
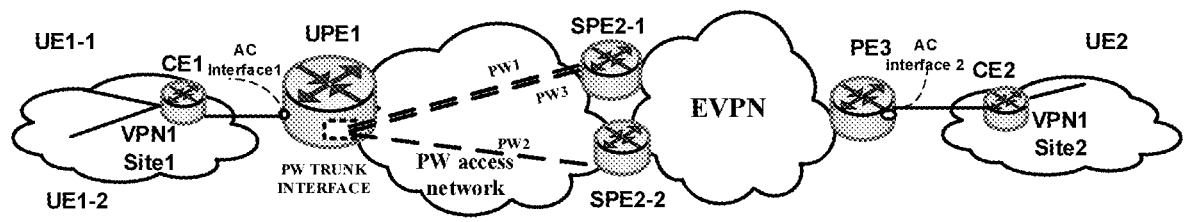
FIG. 2D is a schematic diagram of yet another possible application scenario of the present disclosure.

It should be further noted that, in this embodiment of the present disclosure, in addition to the manner of same source nodes and same destination nodes and the manner of same source nodes and different destination nodes, the PW load sharing deployment manner may be a manner mixing the manner of same source nodes and same destination nodes and the manner of same source nodes and different destination nodes. As shown in FIG. 2d, a PW trunk interface on a UPE1 is associated with three PWs, a PW1, a PW3, and a PW2, to perform load sharing, and both a peer endpoint of the PW1 and a peer endpoint of the PW3 are an SPE2-1 (which belongs to the manner of same source nodes and same destination nodes); and a peer endpoint of the PW2 is an SPE2-2. Therefore, the PW1 and the PW2 belong to the manner of same source nodes and different destination nodes, and the PW3 and the PW2 also belong to the manner of same source nodes and different destination nodes.

The foregoing describes a manner for determining an active/non-active state of the PW when the PW trunk interface is set to the primary/secondary mode. The following uses an example to describe a manner for determining the active/non-active state of the PW in the independent mode when the PW trunk interface is set to the independent mode. For example, as shown in FIG. 2b, a quantity of active PWs is set to 2 for the SPE2-1, the SPE2-2, the SPE2-3, and the SPE2-4. The four PE devices run a communications protocol to notify IP addresses of the four PE devices, and PWs corresponding to two PE devices (for example, the SPE2-1 and the SPE2-2) with relatively large IP addresses or relatively small IP addresses are selected to be in the active state. Therefore, the PW1 and the PW2 are in the active state, and the remaining PW3 and PW4 are in the non-active state. Therefore, the SPE2-1 and the SPE2-2 separately notify the UPE1 that the PW1 and the PW2 are in the active state, and the SPE2-3 and the SPE2-4 separately notify the UPE1 that the PW3 and the PW4 are in the non-active state. The UPE1 separately sets, on the UPE1 according to a notification message, the PW1 and the PW2 that are associated with the PW trunk interface to the active state, and the PW3 and the PW4 to the non-active state.

In a specific implementation, that the first PE device receives the data flow from the CE device, and forwards the data flow to the PW trunk interface comprises the following several manners.

Manner 1: The first PE device receives the data flow from the CE device through an attachment circuit AC interface, and forwards the data flow to the PW trunk interface through the AC interface according to an association relationship between the AC interface and the PW trunk interface. The association relationship (as shown in Table 0) may be completed by means of configuration when the PW trunk interface or the AC interface is created. This manner is applicable to a typical PW networking L2VPN scenario shown in FIG. 2a, and a scenario that is shown in FIG. 2b and FIG. 2c and in which the PW accesses an EVPN and a PW access network is a virtual leased line (VLL). A point-to-point service can be provided by using a VLL L2VPN technology.

TABLE 0

| Association relationship between the AC interface and the PW trunk interface | |
| --- | --- |
| AC interface | PW trunk interface |
| AC interface 1 | PW trunk interface 1 |
| ... | ... |

Manner 2: The first PE device receives the data flow from the CE device through an attachment circuit AC interface, forwards the data flow to a virtual switch instance (VSI) through the AC interface, searches a MAC forwarding table (as shown in Table 1) in the VSI to obtain the PW trunk interface, and forwards the data flow to the PW trunk interface. This manner is applicable to a scenario that is shown in FIG. 2b and FIG. 2c and in which the PW accesses an EVPN and a PW access network is a VPLS. A multipoint service based on the Ethernet can be provided by using a VPLS L2VPN technology. FIG. 2b is used as an example, the UPE1 receives a data flow from the CE1 through the AC interface 1, and a destination MAC address carried in the data flow is a MAC address of the UE2. That is, a destination of the data flow is the UE2. The UPE1 forwards the data flow to the VSI through the AC interface 1, and the VSI comprises the MAC forwarding table (as shown in Table 1). The UPE1 uses the MAC address of the UE2 as an index (or may be referred to as a match entry, a keyword, or the like) to search the MAC forwarding table shown in Table 1 in order to learn that an outbound interface that matches the MAC address of the UE2 is a PW trunk interface 1. It should be noted that, herein the MAC forwarding table is only used as an example, and is used to indicate an association relationship between a destination MAC address and a PW trunk interface. The MAC forwarding table may further include another parameter, and this is not limited herein.

Further, a method for generating a MAC forwarding table entry in Table 1 is described by using examples. The first PE device (for example, the UPE1 in FIG. 2b) receives a MAC broadcast packet from the second PE device (for example, the SPE2-1 or the SPE2-2 in FIG. 2b), a destination MAC address carried in a MAC broadcast packet header is a MAC broadcast address, and a source MAC address carried in the MAC broadcast packet header is a MAC address of the UE2. The UPE1 obtains an inner label (used to represent information about a VPN to which user data belongs, and may also be referred to as a VPN label, a virtual circuit (VC) label, or a VC identifier carried in a payload part of the MAC broadcast packet, and obtains, according to an association relationship between the inner label and a PW identifier, the PW identifier (for example, the PW1 or the PW2) corresponding to the inner label; then obtains a PW trunk interface according to an association relationship (as shown in the following Table 2) between the PW identifier and the PW trunk interface; and finally, uses source MAC (that is, the MAC address of the UE2) carried in the MAC broadcast packet header as destination MAC, and uses the PW trunk interface obtained in the foregoing step as an outbound interface to generate a MAC forwarding table entry shown in Table 1. It should be noted that, the MAC forwarding table entry generation process is completed by performing MAC address flooding and learning in a data plane of the UPE1 after the PW trunk interface is created and is associated with the PW on the UPE1. After being generated, the MAC forwarding table entry is used to instruct subsequent data packet forwarding of a user. The MAC forwarding table entry generation method in this embodiment of the present disclosure is only a possible embodiment, and is not construed as a limitation on the present disclosure.

TABLE 1

| MAC forwarding table | |
| --- | --- |
| Destination MAC | Outbound interface |
| MAC address of the UE2 | PW trunk interface |
| ... | ... |

It should be noted that, an MPLS L2VPN means that user layer 2 data is transparently transmitted on an MPLS network. From a perspective of the user, the MPLS network is a layer 2 switching network, and a layer 2 connection may be established between different nodes. The MPLS L2VPN comprises manners such as a VLL and a VPLS, and both layer 2 connections provided by the VLL and the VPLS are PWs. A difference lies in that the VLL provides a point-to-point VPN service, and comprises one PW; however, the VPLS provides a multipoint VPN service, and comprises multiple PWs.

In the 302 part, the first PE device performs load sharing processing on the data flow, and forwards the data flow by using the at least two active PWs.

As shown in FIG. 2a, the first PE device (PE1) performs load sharing forwarding on the data flow by using the two selected active PWs, the PW1 and the PW2. This case belongs to all-active load sharing deployment, both two PWs associated with the PW trunk interface are used to perform load sharing forwarding, and no secondary PW is deployed for protection when there is a fault. In addition, with this deployment, a bandwidth of the PW may be used to a greatest extent, and bandwidths of all PWs are combined to provide a bandwidth of a maximum capability.

As shown in FIG. 2b, the first PE device (UPE1) selects two active PWs, the PW1 and the PW2, as primary PWs to perform load sharing forwarding on the data flow, and uses the remaining PW3 and PW4 as secondary PWs such that when a primary PW is faulty, the PW may be switched to a secondary PW in order to perform load sharing forwarding. For example, when the PW1 is faulty (the PW1 is switched to a non-active state), the backup PW3 may be enabled (the PW3 is switched to an active state), and two active PWs, the PW2 and the PW3, are used to continuously perform load sharing forwarding on the data flow. Alternatively, when both the PW1 and the PW2 are faulty (both the PW1 and the PW2 are switched to a non-active state), the backup PW3 and PW4 may be enabled (both the PW3 and PW4 are switched to an active state), and two active PWs, the PW3 and the PW4, are used to continuously perform load sharing forwarding on the data flow. This case belongs to a multi-active load sharing deployment scenario. In this case, backup protection is added for a primary load sharing PW. When one or more primary PWs are faulty, it may be ensured that forwarding is not interrupted, a bandwidth provided by the PW is not decreased, and a service is not affected, and this improves reliability of PW load sharing.

As shown in FIG. 2c, the first PE device (UPE1) performs load sharing forwarding on the data flow by using two active PWs, the PW1 and the PW2. This case belongs to all-active load sharing deployment, an effect is the same as that of FIG. 2a, and details are not described herein.

In a specific implementation, a specific load sharing implementation may be establishing a PW trunk forwarding table (such as Table 2) on the first PE device. After the PW trunk interface of the first PE device receives the data flow, the first PE device performs, by using a hash algorithm and based on a configured hash gene, cyclic redundancy check (CRC) to obtain a check value, performs a modulo operation according to a load-sharing PW quantity value by using the check value to obtain a remainder, uses the remainder as a key value, and then uses the key value as an index to search the PW trunk forwarding table in order to match a PW for forwarding.

It should be noted that, input of the hash algorithm is an eigenvalue of each packet, and the eigenvalue is referred to as a hash gene. A packet eigenvalue that can be used as a hash gene comprises but is not limited to: a source MAC address, a destination MAC address, and the like included in an Ethernet frame header; a source IP address, a destination IP address, a protocol number, and the like included in an IP packet header; a source port number, a destination port number, and the like included in a TCP/UDP packet header; an MPLS label, some bits of packet load, and the like included in an MPLS packet header; and a tunnel identifier (Tunnel ID) and a session identifier (Session ID), and the like included in an L2TP packet header, and the like. The hash gene may be one or any combination of several of the packet eigenvalues. The combination of several of the eigenvalues may also be referred to as an N-tuple (N is a positive integer greater than or equal to 1), and the N-tuple is used to identify one service flow. In an embodiment, the hash gene may be pre-configured by a network administrator on the first PE device by using a command line, may be configured by the first PE device according to an instruction of a message that is sent by another control and management device, may be automatically generated and configured by the first PE device by running algorithm software, or may be a default value configured during software implementation of the first PE device.

It should be further noted that, the data flow in the present disclosure refers to a digital coded signal (a data packet) sequence used to transmit (receive or send) information. The data flow comprises ordered data packets, and the data flow may include detailed service flows. For example, as shown in FIG. 2b, the service flow is identified by a 5-tuple including a source IP address, a destination IP address, a protocol number, a source port number, and a destination port number. The CE1 receives a service flow 1 from UE1-1, and the service flow 1 is identified by a 5-tuple 1. A source IP address in the 5-tuple 1 is an IP address of the UE1-1, and a destination IP address in the 5-tuple 1 is an IP address of UE2. The CE1 further receives a service flow 2 from UE1-2, and the service flow 2 is identified by a 5-tuple 2. A source IP address in the 5-tuple 2 is an IP address of the UE1-2, and a destination IP address in the 5-tuple 2 is the IP address of the UE2. The CE1 sends a data flow including the service flow 1 and the service flow 2 to the UPE1.

With reference to the foregoing description, Table 2 is further used as an example to describe the load sharing procedure. As shown in Table 2, a PW activity quantity value is set to 2 on the UPE1, the PW trunk interface is associated with two active PWs, the PW1 and the PW2, and load sharing is performed by using the two PWs. The UPE1 receives the data flow from the CE1 through an AC interface 1. When CRC check is performed on the 5-tuple 1 (used to identify the service flow 1) in the data flow to obtain a CRC check value 1, and a modulo operation is then performed by using the CRC check value 1 and the PW quantity value (equal to 2) to obtain a remainder key1, the PW1 is used to forward the service flow 1. When CRC check is performed on the 5-tuple 2 (used to identify the service flow 2) in the data flow to obtain a CRC check value 2, and a modulo operation is then performed by using the CRC check value 2 and the PW quantity value (equal to 2) to obtain a remainder key2, the PW2 is used to forward the service flow 2. Therefore, PW load sharing forwarding for the data flow including the service flow 1 and the service flow 2 is implemented. Therefore, the load sharing method belongs to per-flow load sharing or per-service-flow load sharing. Because the service flow 1 is sent in order by using the PW1, and the service flow 2 is sent in order by using the PW2, packets do not need to be reassembled on a receive end in order, and per-flow load sharing has a better order preserving capability for a user service flow.

It should be further noted that, the PW trunk forwarding table shown in Table 2 is only an example, and is used to indicate the association relationship between a PW trunk interface and a load sharing PW and instruct forwarding of a data flow. The PW trunk forwarding table may further include one or more of parameters such as an inner label (for example, a virtual circuit identifier (VC ID)), an outer tunnel label, and a peer IP address of the PW, and this is not limited herein.

TABLE 2

| PW trunk forwarding table | | |
| --- | --- | --- |
| PW trunk interface identifier | Key value | Identifier of a load sharing PW |
| PW trunk interface | Key1 | PW1 |
| PW trunk interface | Key2 | PW2 |
| ... | ... | ... |

With the method for performing a hash operation on an eigenvalue in a data packet, this embodiment of the present disclosure provides the per-flow PW load sharing method. In the method, not only a better service flow order preserving effect is obtained, but also a bandwidth and a throughput of the PW are increased. This enhances a data processing capability of a PE device or a UPE device and improves PW deployment flexibility.

In a specific implementation, a specific load sharing implementation may be establishing a PW trunk forwarding table (such as Table 3) on the first PE device. A timer is enabled on the first PE device, and each time a data packet arrives, a value of a counter is increased by 1. After the PW trunk interface of the first PE device receives the data flow (for details, refer to description of the data flow in an embodiment, where the data flow comprises ordered data packets), the first PE device selects, according to a value obtained by the counter by counting each data packet, a PW to perform load sharing forwarding. For example, the first PE device receives the first data packet, a count value is 1, and the first PE device searches Table 3 to obtain an identifier PW1 of a corresponding load sharing PW, and uses the PW1 to forward the first data packet. Then, the first PE device receives the second data packet, a count value is 2, and the first PE device searches Table 3 to obtain an identifier PW2 of a corresponding load sharing PW, and uses the PW2 to forward the second data packet. Likewise, the PW1 is used to forward the third data packet, and the PW2 is used to forward the fourth data packet in sequence . . . in order to implement PW load sharing. It may be learned that, in the method, an eigenvalue (refer to the eigenvalue described in the hash gene part, and details are not described herein) carried in the data packet does not need to be identified. That is, the service flow does not need to be identified to perform forwarding, and therefore, the method belongs to a per-packet load sharing method. Because the service flow does not need to be further identified, forwarding efficiency is relatively high.

TABLE 3

PW trunk forwarding table

| PW trunk interface identifier | Count value | Identifier of a load sharing PW |
| --- | --- | --- |
| PW trunk interface | 1 | PW1 |
| PW trunk interface | 2 | PW2 |
| PW trunk interface | 3 | PW1 |
| PW trunk interface | 4 | PW2 |
| . . . | . . . | . . . |

It should be noted that, the PW trunk forwarding table shown in Table 3 is only an example, and is used to indicate the association relationship between a PW trunk interface and a load sharing PW and instruct forwarding of the data flow. The PW trunk forwarding table may further include one or more of parameters such as an inner label (VC ID), an outer tunnel label, and a peer IP address of the PW, and this is not limited herein.

With the method for performing a hash operation on an eigenvalue in a data packet, this embodiment of the present disclosure provides the per-packet PW load sharing method. In the method, not only forwarding efficiency is relatively high, but also a bandwidth and a throughput of the PW are increased. This enhances a data processing capability of a PE device or a UPE device and improves PW deployment flexibility.

It should be noted that, two active PWs used to perform load sharing forwarding on the data flow are only used as an example for description in the foregoing; in specific implementation, there may be three, four, . . . , (that is, at least two) active PWs, and this is not limited herein.

To enable a person skilled in the art to more clearly understand the forwarding procedure, the following describes a forwarding processing procedure in which a PE device receives a data packet and forwards the data packet.

Figure 4A:
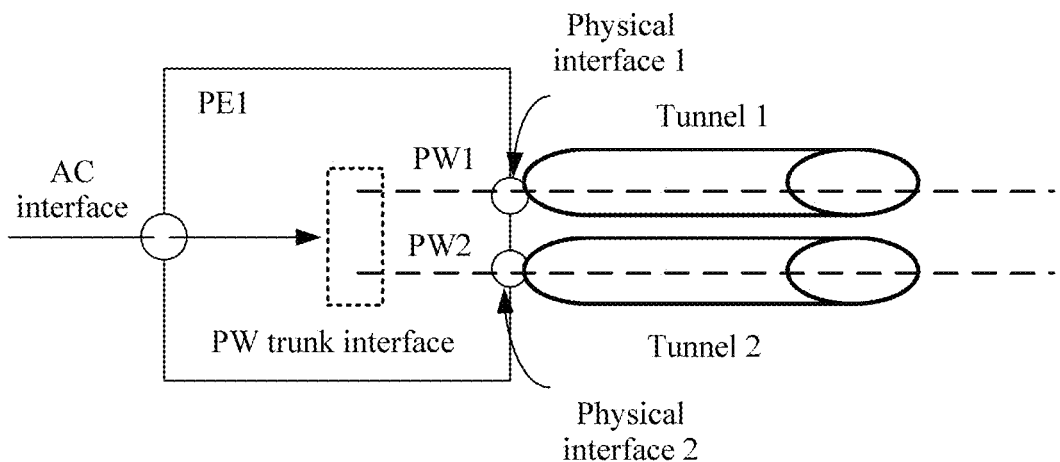
FIG. 4A is a schematic diagram of a forwarding procedure according to an embodiment of the present disclosure.

FIG. 4a is a schematic flowchart of a forwarding embodiment in which a PE device uses a PW trunk interface to perform load sharing forwarding. This manner is applicable to typical PW networking shown in FIG. 2a, and a scenario that is shown in FIG. 2b and FIG. 2c and in which a PW accesses an EVPN and a PW access network is a VLL L2VPN. In this embodiment, a PE1 receives a data packet 1 from a CE device through an AC interface, and forwards the data packet 1 to a PW trunk interface according to an association relationship between the AC interface and the PW trunk interface, and the PW trunk interface is associated with a PW1 and a PW2. Then, the PE1 uses the load sharing manner mentioned in the foregoing embodiment to perform load sharing between the PW1 and the PW2. That is, the PE1 performs CRC check according to a hash gene 1 (for example, a source IP address is an IP address of UE1-1, and a destination IP address is an IP address of UE2) carried in the data packet 1 to obtain a check value 1, performs a modulo operation by using the check value 1 and a PW quantity value (equal to 2) to obtain a key1, and uses the key1 as an index to search a PW trunk forwarding table to obtain the PW1 that matches the key1. Finally, the PE1 obtains, by using a tunnel 1 carrying the PW1, that an inbound interface of the tunnel 1 is a physical interface 1 (for example, an Ethernet interface 1), and forwards the data packet 1 by using the physical interface 1.

Then, the PE1 receives a data packet 2 from the CE device through the AC interface, and forwards the data packet 2 to the PW trunk interface according to the association relationship between the AC interface and the PW trunk interface, and the PW trunk interface is associated with the PW1 and the PW2. Then, the PE1 performs CRC check according to a hash gene 2 (for example, a source IP address is an IP address of UE1-2, and a destination IP address is an IP address of UE2) carried in the data packet 2 to obtain a check value 2, performs a modulo operation by using the check value 2 and a PW quantity value (equal to 2) to obtain a key2, and uses the key2 as an index to search the PW trunk forwarding table to obtain the PW2 that matches the key2. Finally, the PE1 obtains, by using a tunnel 2 carrying the PW2, that an inbound interface of the tunnel 2 is a physical interface 2 (for example, an Ethernet interface 2), and forwards the data packet 2 by using the physical interface 2.

Likewise, the PE1 continues to receive data packets 3, 4, 5, . . . (the data packets 1, 2, 3, . . . form a data flow, and the data flow comprises a service flow 1 identified by the hash gene 1 and a service flow 2 identified by the hash gene 2) from the CE device through the AC interface. According to the foregoing method, the PE1 performs a modulo operation by using a check value obtained after CRC check is performed on a hash gene carried in each data packet and the PW quantity value (equal to 2) to respectively obtain the key1 or the key2 in order to obtain the corresponding PW1 or PW2. Therefore, the service flow 1 is forwarded by the PW1, the service flow 2 is forwarded by the PW2, and load sharing forwarding is implemented for the data flow. This enhances a data processing capability, increases a bandwidth and a throughput, improves PW deployment flexibility, and obtains a better service flow order preserving capability.

Figure 4B:
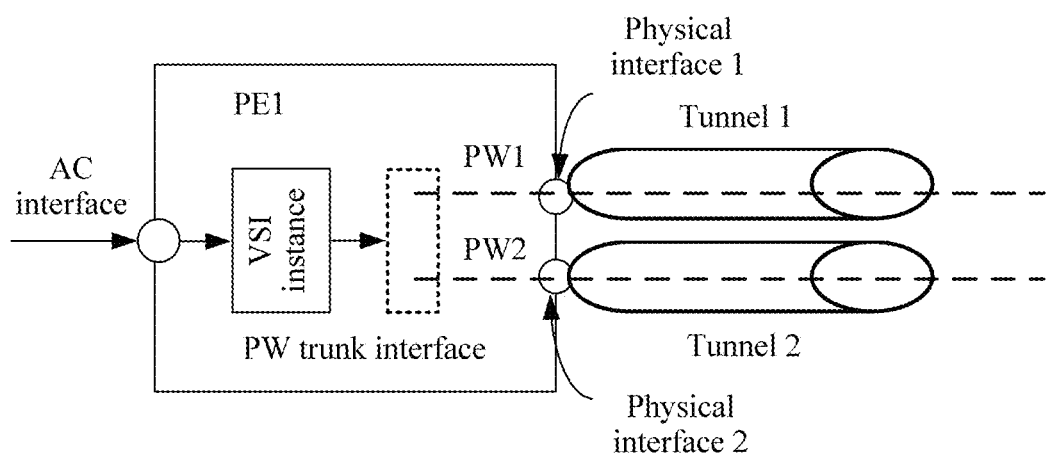
FIG. 4B is a schematic diagram of another forwarding procedure according to an embodiment of the present disclosure.

FIG. 4b is a schematic flowchart of another forwarding embodiment in which a PE device uses a PW trunk interface to perform load sharing forwarding. This manner is applicable to a scenario that is shown in FIG. 2b and FIG. 2c and in which a PW accesses an EVPN and a PW access network is a VPLS L2VPN. In this embodiment, a PE1 receives a data packet 1 from a CE device through an AC interface, and the data packet 1 carries a MAC address of destination UE. The PE1 forwards the data packet 1 to a VSI through the AC interface, uses the MAC address of the destination UE to search a MAC forwarding table in order to obtain that a matched outbound interface is a PW trunk interface, and forwards the data packet 1 to the PW trunk interface, and the PW trunk interface is associated with a PW1 and a PW2. Then, the PE1 performs CRC check according to a hash gene 1 (for example, a source IP address is an IP address of UE1-1, and a destination IP address is an IP address of UE2) carried in the data packet 1 to obtain a check value 1, performs a modulo operation by using the check value 1 and a PW quantity value (equal to 2) to obtain a key1, and uses the key1 as an index to search a PW trunk forwarding table to obtain the PW1 that matches the key1. Finally, the PE1 obtains, by using a tunnel 1 carrying the PW1, that an inbound interface of the tunnel 1 is a physical interface 1 (for example, an Ethernet interface 1), and forwards the data packet 1 by using the physical interface 1.

Then, the PE1 receives a data packet 2 from the CE device through the AC interface, and the data packet 2 carries a MAC address of destination UE. The PE1 forwards the data packet 2 to the VSI through the AC interface, uses the MAC address of the destination UE to search the MAC forwarding table in order to obtain that a matched outbound interface is the PW trunk interface, and forwards the data packet 2 to the PW trunk interface, and the PW trunk interface is associated with the PW1 and the PW2. Then, the PE1 performs CRC check according to a hash gene 2 (for example, a source IP address is an IP address of UE1-2, and a destination IP address is an IP address of UE2) carried in the data packet 2 to obtain a check value 2, performs a modulo operation by using the check value 2 and a PW quantity value (equal to 2) to obtain a key2, and uses the key2 as an index to search the PW trunk forwarding table to obtain the PW2 that matches the key2. Finally, the PE1 obtains, by using a tunnel 2 carrying the PW2, that an inbound interface of the tunnel 2 is a physical interface 2 (for example, an Ethernet interface 2), and forwards the data packet 2 by using the physical interface 2.

Likewise, the PE1 continues to receive data packets 3, 4, 5, . . . (the data packets 1, 2, 3, . . . form a data flow, and the data flow comprises a service flow 1 identified by the hash gene 1 and a service flow 2 identified by the hash gene 2) from the CE device through the AC interface. According to the foregoing method, the PE1 performs a modulo operation by using a check value obtained after CRC check is performed on each data packet and the PW quantity value (equal to 2) to respectively obtain the key1 or the key2 in order to obtain the corresponding PW1 or PW2. Therefore, the service flow 1 is forwarded by the PW1, the service flow 2 is forwarded by the PW2, and load sharing forwarding is implemented for the data flow on the PW1 and the PW2. This enhances a data processing capability of a PE device, increases a bandwidth and a throughput, improves PW deployment flexibility, and obtains a better service flow order preserving capability.

It should be noted that, in FIG. 4a and FIG. 4b, performing PW load sharing according to the hash gene is used as an example to describe the forwarding procedure, a forwarding procedure of performing load sharing according to a count value is similar to this, and a difference only lies in that a corresponding PW is found by using the count value. For details, refer to the method related to Table 3. For brevity, details are not described herein.

It should be understood that, in this embodiment of the present disclosure, that one PW trunk interface and one AC interface are created on the first PE device is used as an example for description, but this is not construed as a limitation. In actual deployment, at least one PW trunk interface and at least one AC interface may be separately created.

It should be further understood that, according to the foregoing description of scenarios in FIG. 2a, FIG. 2b, and FIG. 2c, the first PE device may be a PE device in typical single-layer networking, or may be a UPE device in hierarchical networking according to different networking situations. The PE device in the single-layer networking or the UPE device in the hierarchical networking is described from a perspective of a location of the device in network deployment or a management domain, is a device located on a provider network edge, and is connected to a device (for example, a CE device) in a customer network. Essentially, the PE device or the UPE device is a network device, for example, a router or a switch.

Figure 5A:
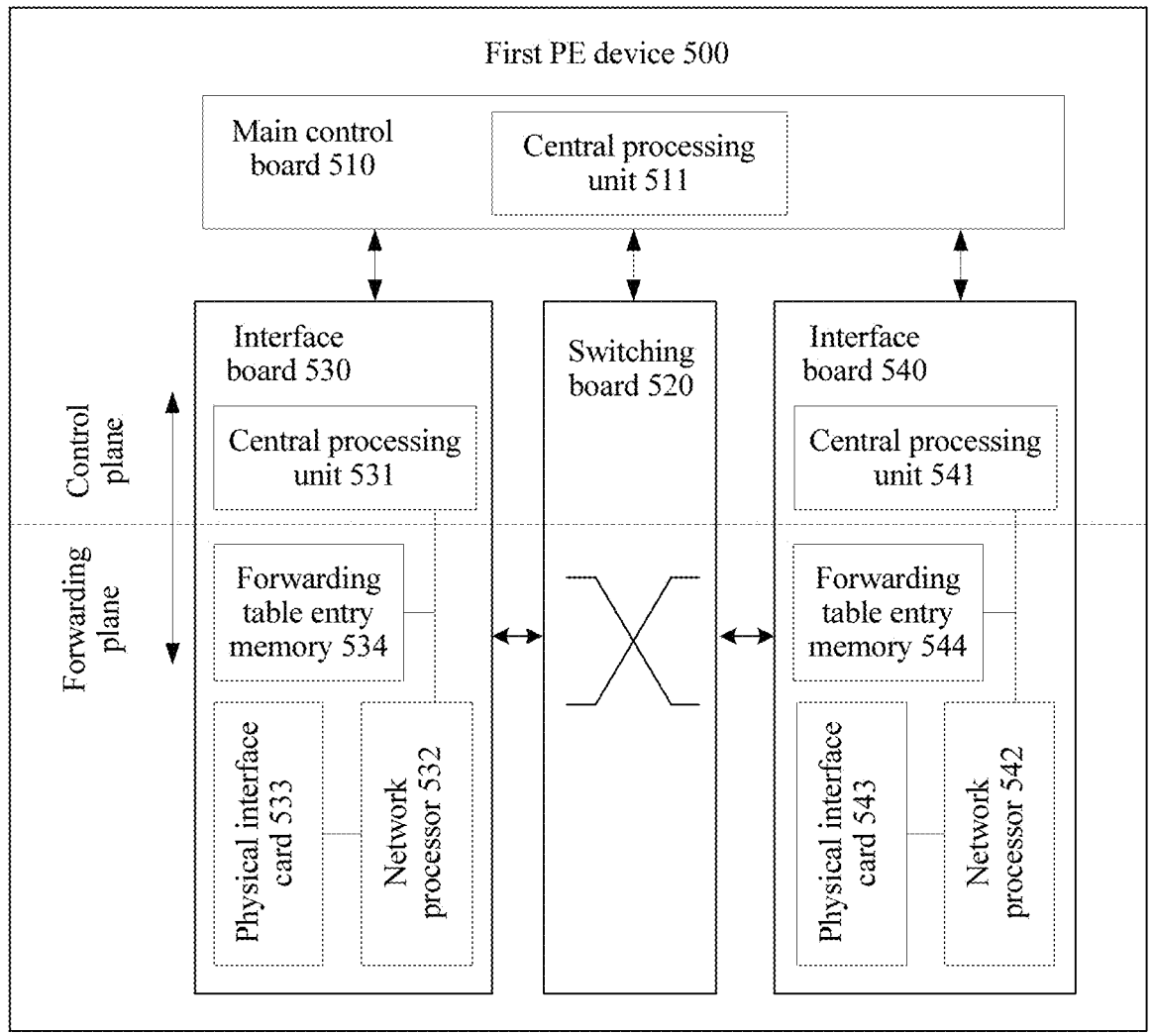
FIG. 5A is a schematic structural diagram of a first PE device according to an embodiment of the present disclosure.

FIG. 5a shows a possible schematic structural diagram of a first PE device related to the foregoing embodiment. A first PE device 500 comprises a main control board 510, an interface board 530, a switching board 520, and an interface board 540. The main control board 510 is configured to complete functions such as system management, device maintenance, and protocol processing. The switching board 520 is configured to complete data exchange between interface boards (the interface board is also referred to as a line card or a service board). The interface board 530 and the interface board 540 are configured to provide various service interfaces (for example, a POS interface, a GE interface, and an ATM interface), and implement rapid forwarding of a data packet. A control plane comprises management and control units of the main control board 510 and management and control units on the interface board 530 and the interface board 540. The main control board 510 mainly comprises three types of function units: a system management and control unit, a system clock unit, and a system maintenance unit. The system management and control unit and the system clock unit are control plane function units, and the system maintenance unit is a monitoring plane function unit. The main control board 510, the interface board 530 and the interface board 540, and the switching board 520 are connected to a system backplane by using a system bus in order to implement communication between each other.

A physical interface card 533 on the interface board 530 is configured to receive a data flow from a CE device. A network processor 532 is configured to forward the data flow to a PW trunk interface, and perform load sharing processing on the data flow, where the PW trunk interface is associated with at least two active PWs. If a physical port of an outer tunnel carrying the at least two active PWs is on the interface board 530, an interface on the physical interface card 533 is used to send the data flow. In this case, it should be noted that, the interface for sending the data flow is different from an interface for receiving the data flow from the CE device. When the interface board 530 has another physical interface card 535, the interface for sending the data flow may be on the physical interface card 535. If the physical port of the tunnel carrying the at least two active PWs is on the interface board 540, the data flow is first sent to the interface board 540 by using the switching board 520, and the data flow is then sent by using an interface on a physical interface card 543.

Before the network processor 532 is configured to forward the data flow to the PW trunk interface, a central processing unit 511 on the main control board 510 is configured to create the PW trunk interface, associate the PW trunk interface with the at least two PWs, and determine at least two PWs as active PWs from the at least two PWs. Then, the central processing unit 511 generates a PW trunk forwarding table entry (such as Table 2 or Table 3), and forwards the PW trunk forwarding table entry to the interface board 530 and/or the interface board 540. A forwarding table entry memory 534 of the interface board 530 and/or a forwarding table entry memory 544 of the interface board 540 are/is configured to store the PW trunk forwarding table entry.

In a possible implementation, the central processing unit 511 on the main control board 510 is further configured to obtain an active PW quantity parameter, where the active PW quantity parameter represents a quantity of PWs in an active state, and is a positive integer greater than or equal to 2; and determine at least two active PWs from the at least two PWs according to the active PW quantity parameter.

The central processing unit 511 on the main control board 510 is further configured to obtain the active PW quantity parameter. In a possible implementation, the central processing unit 511 is further configured to obtain a priority of each PW in the at least two PWs, and determine, from the at least two PWs, at least two PWs with higher priority ranks as active PWs according to a descending order of the priorities of the PWs and the active PW quantity parameter. The priority of the PW is used to indicate precedence in using the PW as an active PW.

The central processing unit 511 on the main control board 510 is further configured to obtain the active PW quantity parameter. In another possible implementation, the central processing unit 511 is further configured to obtain an IP address of a peer second PE of each PW in the at least two PWs, and determine, from the at least two PWs, at least two PWs with higher IP address ranks as active PWs according to a descending order of the IP addresses of the peer second PEs of the PWs and the active PW quantity parameter.

The central processing unit 511 on the main control board 510 is further configured to obtain the active PW quantity parameter. In still another possible implementation, the central processing unit 511 is further configured to obtain an IP address of a peer second PE of each PW in the at least two PWs, and determine, from the at least two PWs, at least two PWs with higher IP address ranks as active PWs according to an ascending order of the IP addresses of the peer second PEs of the PWs and the active PW quantity parameter.

The central processing unit 511 on the main control board 510 is further configured to obtain the active PW quantity parameter. In yet another possible implementation, the central processing unit 511 is further configured to obtain a priority of each PW in the at least two PWs and an IP address of a peer second PE of each PW in the at least two PWs, and determine at least two PWs as active PWs according to the priority of each PW in the at least two PWs, the IP address of the peer second PE of each PW in the at least two PWs, and the active PW quantity parameter.

In another possible implementation, a physical interface (connected to the CE device, and configured as an AC interface by the central processing unit 511 on the main control board 510) on the physical interface card 533 on the interface board 530 is configured to receive the data flow from the CE device. The forwarding table entry memory 534 on the interface board 530 is further configured to store an association relationship table entry (such as Table 0) between an AC interface and a PW trunk interface. The network processor 532 on the interface board 530 is further configured to search for an association relationship between the AC interface and the PW trunk interface, and forward the data flow to the PW trunk interface. The central processing unit 511 on the main control board 510 generates an association relationship table entry between the AC interface and the PW trunk interface, and delivers the association relationship table entry between the AC interface and the PW trunk interface to the forwarding table entry memory 534 on the interface board 530 and/or the forwarding table entry memory 544 on the interface board 540.

In still another possible implementation, a physical interface (connected to the CE device, and configured as an AC interface) on the physical interface card 533 on the interface board 530 is configured to receive the data flow from the CE device. The forwarding table entry memory 534 on the interface board 530 is further configured to store a MAC forwarding table (such as Table 1, storing an association relationship between destination MAC and a PW trunk interface). The network processor 532 on the interface board 530 is further configured to forward the data flow to a virtual switch instance VSI, search the MAC forwarding table in the VSI to obtain the PW trunk interface, and forward the data flow to the PW trunk interface. The network processor 532 on the interface board 530 generates a MAC forwarding table entry, and sends the MAC forwarding table entry to the forwarding table entry memory 534 on the interface board 530 for storage. It should be noted that, in some possible designs, generation of the MAC forwarding table entry may be completed by a dedicated Ethernet processing chip, and this is not limited herein.

In yet another possible implementation, the central processing unit 511 on the main control board 510 is further configured to generate an association relationship among the PW trunk interface, a key value (refer to description of per-flow load sharing in the 302 part), and the at least two active PWs, and the forwarding table entry memory 534 on the interface board 530 is further configured to store the association relationship among the PW trunk interface, the key value, and the at least two active PWs.

In yet another possible implementation, the central processing unit 511 on the main control board 510 is further configured to generate an association relationship among the PW trunk interface, a count value (refer to description of per-packet load sharing in the 302 part), and the at least two active PWs, and the forwarding table entry memory 534 on the interface board 530 is further configured to store the association relationship among the PW trunk interface, the count value, and the at least two active PWs.

The first PE device 500 in this embodiment of the present disclosure may be corresponding to the first PE device in the PW load sharing method embodiments, and modules and the other operations and/or functions of the first PE device 500 are separately used to implement steps and methods that are implemented by the first PE device in the embodiments corresponding to FIG. 2a to FIG. 4b. For brevity, details are not described herein.

It should be noted that, there may be one or more main control boards. When there are multiple main control boards, the multiple main control boards may include a primary main control board and a secondary main control board. There may be one or more interface boards, and a stronger data processing capability of the first PE device indicates a larger quantity of provided interface boards. There may be one or more physical interface cards on the interface board. There may be no switching board, or may be one or more switching boards. When there are multiple switching boards, the multiple switching boards may jointly implement load sharing redundancy backup. In a centralized forwarding architecture, the first PE device may not need a switching board, and the interface board implements a service data processing function in the entire system. In a distributed forwarding architecture, the first PE device may have at least one switching board, and data exchange between multiple interface boards is implemented by using the switching board in order to provide a large-capacity data exchange and processing capability. Therefore, a data access and processing capability of the first PE device in the distributed architecture is better than that of a device in the centralized architecture. A specific architecture depends on a specific networking deployment scenario, and this is not limited herein.

Figure 5B:
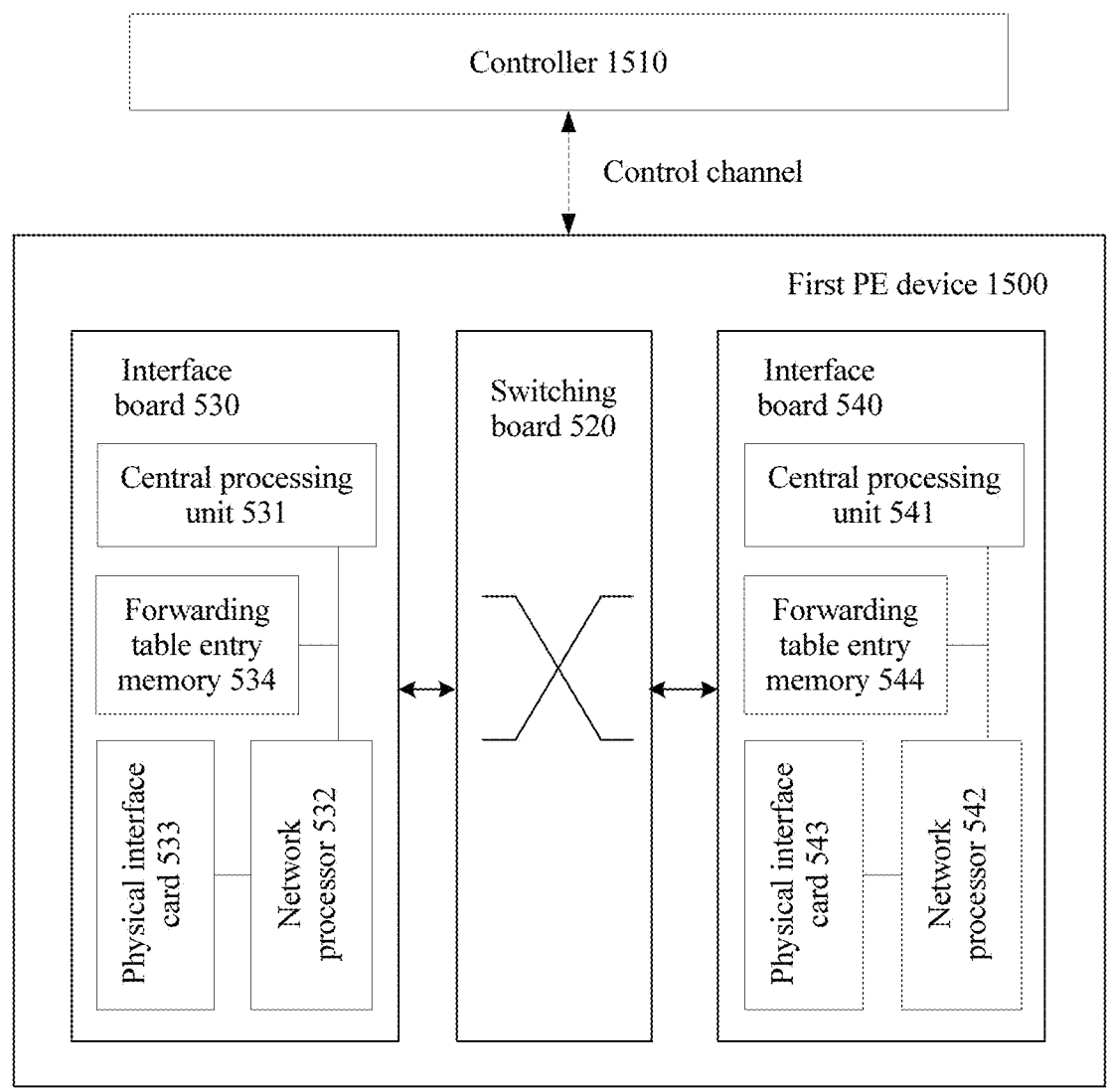
FIG. 5B is a schematic structural diagram of another first PE device and a controller according to an embodiment of the present disclosure.

FIG. 5b shows another possible schematic structural diagram of a first PE device related to the foregoing embodiment and a schematic block diagram of a controller 1510.

This product form is applicable to a network architecture (for example, software-defined networking (SDN)) in which control and forwarding are separated. In the SDN, the main control board 510 of the first PE device 500 shown in FIG. 5a is separated from the device, and forms a new independent physical device (that is, the controller 1510 shown in FIG. 5b), and remaining components form another independent physical device (that is, a first PE device 1500 shown in FIG. 5b). The controller 1510 interacts with the first PE device 1500 by using a control channel protocol. The control channel protocol may be the OpenFlow protocol, the Path Computation Element Communication Protocol (PCEP), the Border Gateway Protocol (BGP), the Interface to the Routing System (Interface to the Routing System, I2RS), or the like.

The controller 1510 may be implemented based on a general purpose physical server or a dedicated hardware structure. In a design example, the controller comprises a receiver, a processor, a transmitter, a random access memory, a read-only memory, and a bus. The processor is separately coupled to the receiver, the transmitter, the random access memory, and the read-only memory by using the bus. When the controller needs to be run, a basic input/output system or a bootloader in an embedded system that is built into the read-only memory is used to lead a system to start, and lead the controller to enter a normal running state. After entering the normal running state, the controller runs an application program and an operating system in the random access memory such that the processor executes all functions and steps of the main control board 510 in FIG. 5a.

The first PE device 1500 may be implemented based on a dedicated hardware structure, and functions and structures of the first PE device remain the same as functions and structures of the interface board 530, the interface board 540, and the switching board 520 in FIG. 5b in order to execute corresponding steps. Alternatively, the first PE device 1500 may be a virtual PE device implemented based on a general purpose physical server and a Network Functions Virtualization (NFV) technology, and the virtual PE device is a virtual router.

The controller 1510 and modules and the other operations and/or functions of the first PE device 1500 are separately used to implement steps and methods that are implemented by the first PE device in the embodiments corresponding to FIG. 2a to FIG. 4b. For brevity, details are not described herein.

Figure 6:
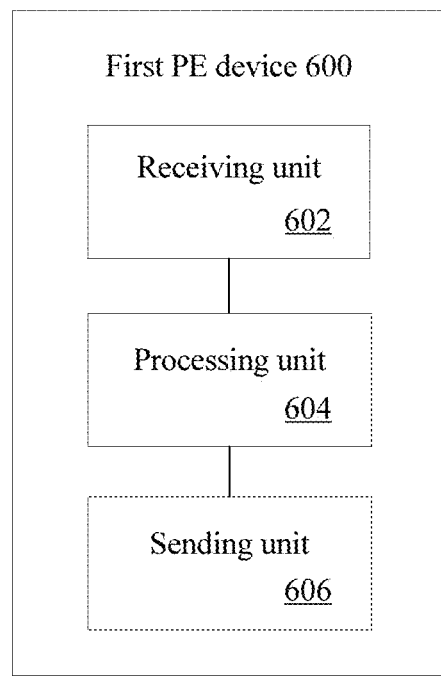
FIG. 6 is a schematic structural diagram of still another first PE device according to an embodiment of the present disclosure.

FIG. 6 shows still another possible schematic structural diagram of a first PE device related to the foregoing embodiment. A first PE device 600 comprises a receiving unit 602, a processing unit 604, and a sending unit 606.

The receiving unit 602 is configured to receive a data flow from a CE device. The processing unit 604 is configured to forward the data flow to a PW trunk interface, and perform load sharing processing on the data flow, where the PW trunk interface is associated with at least two active PWs. The sending unit 606 is configured to forward the data flow by using the at least two active PWs.

Before the processing unit 604 is configured to forward the data flow to the PW trunk interface, the processing unit 604 is further configured to create the PW trunk interface, associate the PW trunk interface with the at least two PWs, and determine at least two PWs as active PWs from the at least two PWs.

In a possible implementation, the processing unit 604 is further configured to obtain an active PW quantity parameter, where the active PW quantity parameter represents a quantity of PWs in an active state, and is a positive integer greater than or equal to 2; and determine at least two active PWs from the at least two PWs according to the active PW quantity parameter.

The processing unit 604 is configured to obtain the active PW quantity parameter. In a possible implementation, the processing unit 604 is further configured to obtain a priority of each PW in the at least two PWs, and determine, from the at least two PWs, at least two PWs with higher priority ranks as active PWs according to a descending order of the priorities of the PWs and the active PW quantity parameter. The priority of the PW is used to indicate precedence in using the PW as an active PW.

The processing unit 604 is configured to obtain the active PW quantity parameter. In another possible implementation, the processing unit 604 is further configured to obtain an IP address of a peer second PE of each PW in the at least two PWs, and determine, from the at least two PWs, at least two PWs with higher IP address ranks as active PWs according to a descending order of the IP addresses of the peer second PEs of the PWs and the active PW quantity parameter.

The processing unit 604 is configured to obtain the active PW quantity parameter. In still another possible implementation, the processing unit 604 is further configured to obtain an IP address of a peer second PE of each PW in the at least two PWs, and determine, from the at least two PWs, at least two PWs with higher IP address ranks as active PWs according to an ascending order of the IP addresses of the peer second PEs of the PWs and the active PW quantity parameter.

The processing unit 604 is configured to obtain the active PW quantity parameter. In yet another possible implementation, the processing unit 604 is further configured to obtain a priority of each PW in the at least two PWs and an IP address of a peer second PE of each PW in the at least two PWs, and determine at least two PWs as active PWs according to the priority of each PW in the at least two PWs, the IP address of the peer second PE of each PW in the at least two PWs, and the active PW quantity parameter.

In another possible implementation, the receiving unit 602 is configured to receive the data flow from the CE device through an attachment circuit AC interface. The processing unit 604 is configured to forward the data flow to the PW trunk interface according to an association relationship between the AC interface and the PW trunk interface. The first PE device 600 further comprises a storage unit, configured to store the association relationship between the AC interface and the PW trunk interface.

In still another possible implementation, the receiving unit 602 is configured to receive the data flow from the CE device through an attachment circuit AC interface. The processing unit 604 is configured to forward the data flow to a virtual switch instance VSI, search a MAC forwarding table in the VSI to obtain the PW trunk interface, and forward the data flow to the PW trunk interface. The first PE device 600 further comprises a storage unit, configured to store the MAC forwarding table.

In yet another possible implementation, the processing unit 604 is further configured to generate an association relationship among the PW trunk interface, a key value (refer to description of per-flow load sharing in the 302 part), and the at least two active PWs, and the storage unit is further configured to store the association relationship.

In yet another possible implementation, the processing unit 604 is further configured to generate an association relationship among the PW trunk interface, a count value (refer to description of per-packet load sharing in the 302 part), and the at least two active PWs, and the storage unit is further configured to store the association relationship.

The first PE device 600 in this embodiment of the present disclosure may be corresponding to the first PE device in the PW load sharing method embodiments, and modules and the other operations and/or functions of the first PE device 600 are separately used to implement steps and methods that are implemented by the first PE device in the embodiments corresponding to FIG. 2a to FIG. 4b. For brevity, details are not described herein.

Figure 7:
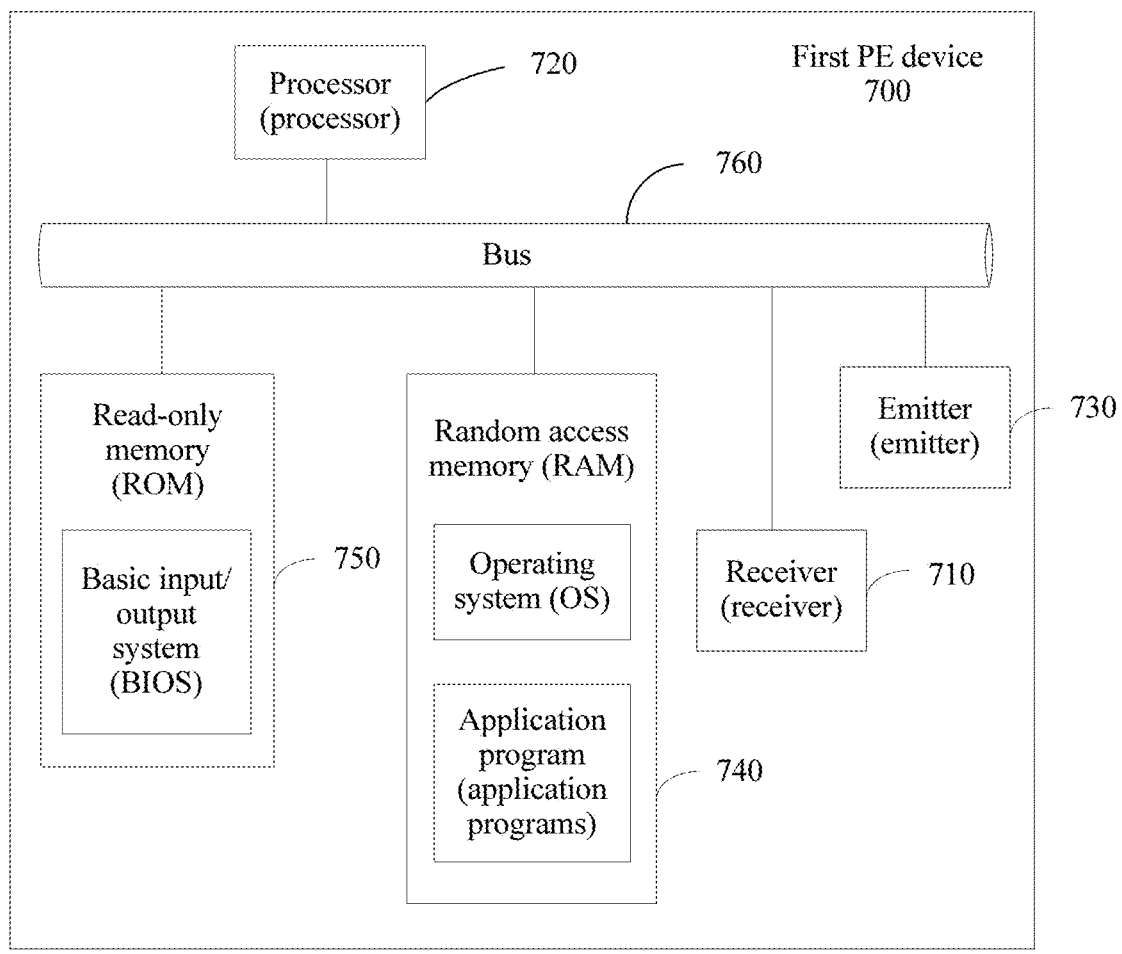
FIG. 7 is a schematic structural diagram of yet another first PE device according to an embodiment of the present disclosure.

FIG. 7 shows yet another possible schematic structural diagram of a first PE device related to the foregoing embodiment. A first PE device 700 comprises a receiver 710, a processor 720, a transmitter 730, a random access memory 740, a read-only memory 750, and a bus 760. The processor 720 is separately coupled to the receiver 710, the transmitter 730, the random access memory 740, and the read-only memory 750 by using the bus 760. When the first PE device 700 needs to be run, a basic input/output system or a bootloader in an embedded system that is built into the read-only memory 750 is used to lead a system to start, and lead the first PE device 700 to enter a normal running state. After entering the normal running state, the first PE device 700 runs an application program and an operating system in the random access memory 740 in order to implement the following functions.

The receiver 710 is configured to receive a data flow from a CE device. The processor 720 is configured to forward the data flow to a PW trunk interface, where the PW trunk interface is associated with at least two active PWs; and perform load sharing processing on the data flow. The transmitter 730 is configured to forward the data flow by using the at least two active PWs.

Before the processor 720 is configured to forward the data flow to the PW trunk interface, the processor 720 is further configured to create the PW trunk interface, associate the PW trunk interface with the at least two PWs, and determine at least two PWs as active PWs from the at least two PWs.

The first PE device 700 in this embodiment of the present disclosure may be corresponding to the first PE device in the PW load sharing method embodiments, and modules and the other operations and/or functions of the first PE device 700 are separately used to implement steps and methods that are implemented by the first PE device in the embodiments corresponding to FIG. 2a to FIG. 4b. The processor 720 is configured to execute all operations of the processing unit 604 of the first PE device in FIG. 6. The receiver 710 is configured to execute all operations of the receiving unit 602 of the first PE device in FIG. 6. The transmitter 730 is configured to execute all operations of the sending unit 606 of the first PE device in FIG. 6. For brevity, details are not described herein.

In another possible embodiment, the first PE device may be a virtual PE device implemented based on a general purpose physical server and a Network Functions Virtualization (NFV) technology, and the virtual PE device is a virtual router. The virtual PE device may be a virtual machine that runs a program for providing a PW load sharing function, and the virtual machine is deployed on a hardware device (for example, a physical server). The virtual machine refers to a complete computer system that is simulated by using software, that has functions of a complete hardware system, and that runs in a completely isolated environment. The virtual PE device executes all functions and operations of the first PE device 700.

In another possible embodiment, the controller shown in FIG. 5b may be a virtual controller implemented based on a general purpose physical server and a NFV technology, the virtual controller may be a virtual machine that runs a program for providing a PW load sharing control function, and the virtual machine is deployed on a hardware device (for example, a physical server). The virtual machine refers to a complete computer system that is simulated by using software, that has functions of a complete hardware system, and that runs in a completely isolated environment. The virtual controller executes all functions and operations of the controller 1510 shown in FIG. 5b.

It should be understood that, FIG. 5a, FIG. 5b, FIG. 6, and FIG. 7 show only a simplified design of the first PE device and a simplified design of the controller. In actual application, the first PE device may include a random quantity of receivers, transmitters, processors, memories, main control boards, interface boards, switching boards, physical interface cards, and the like, and all first PE devices that can implement the present disclosure shall fall within the protection scope of the present disclosure.

It should be understood that, based on this application, a person skilled in the art can combine optional features, steps, or methods that are described in the embodiments of this application without creative efforts, and this belongs to the embodiments disclosed in this application. For brevity, description of different combinations is not repeatedly provided.

It should be understood that, based on this application, a person skilled in the art can combine optional features, steps, or methods that are described in the embodiments of this application without creative efforts, and this belongs to the embodiments disclosed in this application. For brevity, description of different combinations is not repeatedly provided.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure may be implemented in a form of a software product. The software product is stored in a storage medium, and comprises several instructions for instructing a computer device (which may be a personal computer, a server, or a network device) to perform all or some of the steps of the methods described in the embodiments of the present disclosure. The foregoing storage medium comprises any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a first provider edge (PE) device in an Ethernet Virtual Private Network (EVPN), wherein the method comprises:
   separately connecting to at least one second PE device using at least two pseudo wires (PWs);
   determining at least two active pseudo wires (PWs) from the at least two PWs based on an Internet Protocol (IP) address of a peer second PE of each of the at least two PWs;
   receiving a data flow from a customer edge (CE) device; and
   forwarding the data flow to the at least one second PE device via the at least two active PWs.

2. The method of claim 1, wherein the at least two active PWs are associated with a PW trunk interface of the first PE device.

3. The method of claim 2, further comprising:
   further receiving the data flow from the CE device through an attachment circuit (AC) interface; and
   storing an association relationship between the AC interface and the PW trunk interface.

4. The method of claim 1, further comprising further determining the at least two active PWs based on an active PW quantity parameter representing a quantity of PWs in an active state, wherein the active PW quantity parameter is a positive integer greater than or equal to 2.

5. The method of claim 4, further comprising further determining the at least two active PWs based on a priority of each active PW in the at least two active PWs, wherein the priority indicates precedence in using an active PW.

6. The method of claim 5, wherein the at least two active PWs are PWs with higher priority ranks according to a descending order of priorities.

7. The method according to claim 1, further comprising:
   further receiving the data flow from the CE device through an attachment circuit (AC) interface; and
   determining the at least two active PWs according to the AC interface.

8. A first provider edge (PE) device in an Ethernet Virtual Private Network (EVPN), wherein the first PE device comprises:
   a memory configured to store instructions;
   a processor coupled to the memory and configured to execute the instructions, to cause the first PE device to:
      separately connect to at least one second PE device using at least two pseudo wires (PWs);
      determine at least two active pseudo wires (PWs) from the at least two PWs based on an Internet Protocol (IP) address of a peer second PE of each of the at least two PWs;
      receive a data flow from a customer edge (CE) device; and
      forward the data flow to the at least one second PE device via the at least two active PWs.

9. The first PE device of claim 8, wherein the at least two active PWs are associated with a PW trunk interface of the first PE device.

10. The first PE device of claim 9, wherein the processor is further configured to execute the instructions to cause the first PE device to:
    further receive the data flow from the CE device through an attachment circuit (AC) interface; and
    store an association relationship between the AC interface and the PW trunk interface.

11. The first PE device of claim 8, wherein the processor is further configured to execute the instructions to cause the first PE device to further determine the at least two active PWs based on an active PW quantity parameter representing a quantity of PWs in an active state, and wherein the active PW quantity parameter is a positive integer greater than or equal to 2.

12. The first PE device of claim 11, wherein the processor is further configured to execute the instructions to cause the first PE device to further determine the at least two active PWs based on a priority of each PW in the at least two active PWs, wherein the priority indicates precedence in using an active PW.

13. The first PE device of claim 12, wherein the at least two active PWs are PWs with higher priority ranks according to a descending order of priorities.

14. The first PE device of claim 10, wherein the processor is further configured to execute the instructions to cause the first PE device to:

further receive the data flow from the CE device through an attachment circuit (AC) interface; and determine the at least two active PWs according to the AC interface.

15. A computer program product comprising instructions that are stored on a non-transitory computer-readable medium and that, when executed by a processor, cause a first provider edge (PE) device in an Ethernet Virtual Private Network (EVPN) to:

separately connect to at least one second PE device using at least two pseudo wires (PWs);

determine at least two active pseudo wires (PWs) from the at least two PWs based on an Internet Protocol (IP) address of a peer second PE of each of the at least two PWs;

receive a data flow from a customer edge (CE) device; and forward the data flow to the at least one second PE device via the at least two active PWs.

16. The computer program product of claim 15, wherein the at least two active PWs are associated with a PW trunk interface of the first PE device.

17. The computer program product of claim 16, wherein the instructions when executed by the processor, further cause the first PE device to:

further receive the data flow from the CE device through an attachment circuit (AC) interface; and store an association relationship between the AC interface and the PW trunk interface.

18. The computer program product of claim 15, wherein the instructions, when executed by the processor, further cause the first PE device to further determine the at least two active PWs based on an active PW quantity parameter representing a quantity of PWs in an active state, and wherein the active PW quantity parameter is a positive integer greater than or equal to 2.

19. The computer program product of claim 18, wherein the instructions, when executed by the processor, further cause the first PE device to further determine the at least two active PWs based on a priority of each active PW in the at least two active PWs, and wherein the priority indicates precedence in using an active PW.

20. The computer program product of claim 19, wherein the at least two active PWs are PWs with higher priority ranks according to a descending order of priorities.

21. The computer program product of claim 15, wherein the instructions, when executed by the processor, further cause the first PE device to:

receive the data flow from the CE device through an attachment circuit (AC) interface; and determine the at least two active PWs according to the AC interface.

* * * * *

UNITED STATES PATENT AND TRADEMARK OFFICE
CERTIFICATE OF CORRECTION

PATENT NO. : 11,563,680 B2
APPLICATION NO. : 17/187023
DATED : January 24, 2023
INVENTOR(S) : Wang Pan It is certified that error appears in the above-identified patent and that said Letters Patent is hereby corrected as shown below:

In the Claims

Claim 14, Column 30, Line 65: "claim 10" should read "claim 8"

Signed and Sealed this
Twenty-first Day of March, 2023

Katherine Kelly Vidal
Director of the United States Patent and Trademark Office